(12) United States Patent
Hayashi

(10) Patent No.: US 7,418,704 B2
(45) Date of Patent: Aug. 26, 2008

(54) PROGRAM EXECUTION APPARATUS

(75) Inventor: Kunihiko Hayashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1055 days.

(21) Appl. No.: 10/620,697

(22) Filed: Jul. 17, 2003

(65) Prior Publication Data

US 2004/0054998 A1    Mar. 18, 2004

(30) Foreign Application Priority Data

Jul. 26, 2002    (JP)    ............... 2002-218869

(51) Int. Cl.
*G06F 9/46* (2006.01)
(52) U.S. Cl. .................. 718/100; 718/102; 718/103
(58) Field of Classification Search ............ 718/100, 718/102–103
See application file for complete search history.

(56) References Cited

U.S. PATENT DOCUMENTS

| | | | |
|---|---|---|---|
| 5,437,032 A | | 7/1995 | Wolf et al. |
| 6,061,709 A | * | 5/2000 | Bronte ..................... 718/103 |
| 6,324,562 B1 | * | 11/2001 | Inagaki et al. ............. 718/100 |
| 6,895,583 B1 | * | 5/2005 | Koning ..................... 718/100 |
| 7,155,716 B2 | * | 12/2006 | Hooman et al. ............ 718/102 |
| 2001/0027463 A1 | * | 10/2001 | Kobayashi ................. 709/103 |
| 2002/0065867 A1 | * | 5/2002 | Chauvel .................... 709/104 |

FOREIGN PATENT DOCUMENTS

JP    62-284437    12/1987

* cited by examiner

*Primary Examiner*—Meng-Ai An
*Assistant Examiner*—Kenneth Tang
(74) *Attorney, Agent, or Firm*—McDermott Will & Emery LLP

(57) ABSTRACT

Provided is a program execution apparatus that appropriately determines an execution sequence of tasks each given a target completion time before which execution of the task is to be completed, and executes the tasks according to the determined execution sequence. For each task a plurality of types of priorities having a hierarchical relationship among them are set. The apparatus includes: a storing unit that stores an identifier of each task that is already in existence, at a memory position therein determined based upon a plurality of types of priorities set for each task; a receiving unit that receives an identifier of a new task, and a plurality of types of priorities set for the new task; and a writing unit that writes the received identifier at a memory position in the storing unit determined based upon the received plurality of types of priorities.

6 Claims, 14 Drawing Sheets

PROGRAM EXECUTION APPARATUS

This application is based upon an application Ser. No. 2002-218869 filed in Japan, the content of which is hereby incorporated by reference.

BACKGROUND OF THE INVENTION (1) Field of the Invention

The present invention relates to a task management function of an operating system, and in particular to a technique for determining an execution sequence of tasks.

(2) Description of the Related Art

Major functions of an operating system (OS) include hardware management, task management, data management, and input/output management. Among these, task management is a particularly important function of managing an execution sequence of tasks, for enabling efficient operations of a CPU, memory, input/output apparatus etc. A "task" is a unit of control for managing a processing flow of a program from its activation, execution, through termination etc. Programs that operate under management of the OS are treated as tasks, and execution, priority processing, parallel processing etc. of programs are all realized in units of tasks.

One of algorithms for determining an execution sequence of tasks is a "priority method". To put it simply, the priority method is a method of determining an execution sequence of tasks based upon priorities set for the tasks.

According to a conventional priority method, however, an execution sequence of a plurality of tasks for which the same priority is set is determined in the order of arrival of the tasks. The conventional priority method therefore fails to appropriately control an execution sequence of such tasks that are given the same priority.

SUMMARY OF THE INVENTION

In view of the above problem, the object of the present invention is to provide a program execution apparatus, a task management method, and a task management program for appropriately determining an execution sequence of tasks.

To achieve the above object, the present invention provides a program execution apparatus that determines an execution sequence of tasks each of which is given a target completion time before which execution of the task is to be completed, and executes the tasks according to the determined execution sequence. A plurality of types of priorities having a hierarchical relationship among them are set for each task. The program execution apparatus includes: a storing unit that stores an identifier of each task that is already in existence, at a memory position therein determined based upon a plurality of types of priorities set for each task; a receiving unit that receives an identifier of a new task and a plurality of types of priorities set for the new task; and a writing unit that writes the identifier received by the receiving unit, at a memory position in the storing unit determined based upon the plurality of types of priorities received by the receiving unit. The program execution apparatus is characterized by determining an execution sequence of tasks whose identifiers are stored in the storing unit, according to an arrangement sequence of the identifiers in the storing unit.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings.

DESCRIPTION OF THE PREFERRED EMBODIMENT

The following describes a mobile telephone 1 as a preferred embodiment of the present invention. The mobile telephone 1 employs the task management method of the present invention.

[1] Mobile Telephone 1

(1) Construction of Mobile Telephone 1

Figure 1:
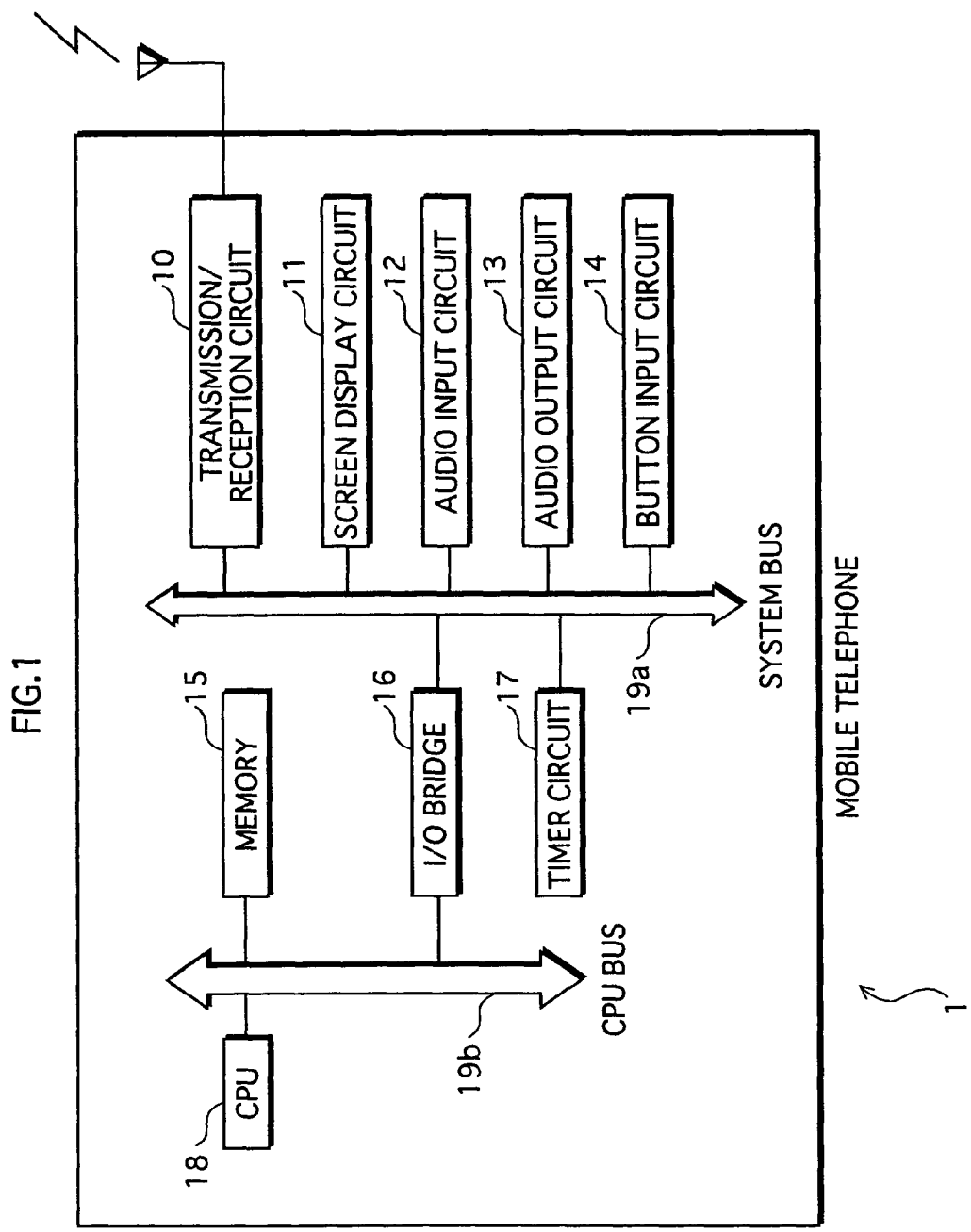
FIG. 1 is a block diagram showing the construction of a mobile telephone 1.

As shown in FIG. 1, the mobile telephone 1 is roughly composed of a transmission/reception circuit 10, a screen display circuit 11, an audio input circuit 12, an audio output circuit 13, a button input circuit 14, a memory 15, an I/O bridge 16, a timer circuit 17, and a CPU 18. Although not shown in the figure, the mobile telephone 1 also includes a liquid crystal display (LCD) unit, an operational unit equipped with a ten key and other keys, a speaker, and a microphone.

The transmission/reception circuit 10, the screen display circuit 11, the audio input circuit 12, the audio output circuit 13, the button input circuit 14, and the timer circuit 17 are connected with one another via a system bus 19a. The memory 15 and the CPU 18 are connected with each other via a CPU bus 19b. The system bus 19a and the CPU bus 19b are connected with each other via the I/O bridge 16.

The transmission/reception circuit 10 transmits and receives communication data and audio data. The communication data is specifically e-mail, a sender's telephone number, or the like. At the time of receiving a call, e-mail, etc., the transmission/reception circuit 10 first receives communication data and audio data. The received communication data is once written into the memory 15. The screen display circuit 11 then reads the communication data from the memory 15 and displays the communication data on the LCD unit. The received audio data is outputted from the speaker as audio, via the audio output circuit 13.

At the time of transmitting a call, e-mail, or the like, the button input circuit 14 receives an input of a recipient's telephone number or the like. The transmission/reception circuit 10 then transmits a call, e-mail, or the like using the received input. After the line-connection to the recipient is achieved, the transmission/reception circuit 10 transmits audio inputted via the microphone and the audio input circuit 12.

The memory 15 stores communication data, screen data, audio data, button input data, and the like. In addition to such data, the memory 15 stores a control program called a "real-time operating system", and a plurality of instruction programs for processing communication data, screen data, audio data, and input data.

The timer circuit 17 outputs a time-out signal to the CPU 18, to give notification about the switching timing of programs to be executed and data to be processed.

(2) Operation of the CPU 18 in the Mobile Telephone 1

The CPU 18 reads a control program from the memory 15. According to the read control program, the CPU 18 reads one instruction program at a time from the memory 15. The CPU 18 then decodes the read instruction program, and executes an instruction obtained by decoding the instruction program. At the time of executing the instruction, the CPU 18 reads, from the memory 15, necessary communication data, image data, screen data, audio data, and input data.

Also, the CPU 18 writes an operational result obtained by executing the instruction, into the memory 15. In the case of a mobile telephone, the operational result specifically corresponds to the above communication data, screen data, and audio data. The CPU 18 therefore reads these data from the memory 15, and subjects the read data to transmission and playback processes.

In the present embodiment, execution units of instruction programs executed by the CPU 18 are referred to as "tasks". Also, determination of an execution sequence of instruction programs (tasks) according to the control program is referred to as "scheduling of tasks".

[2] Task Scheduling Method

The following describes a task scheduling method employed in the mobile telephone 1.

Figure 2:
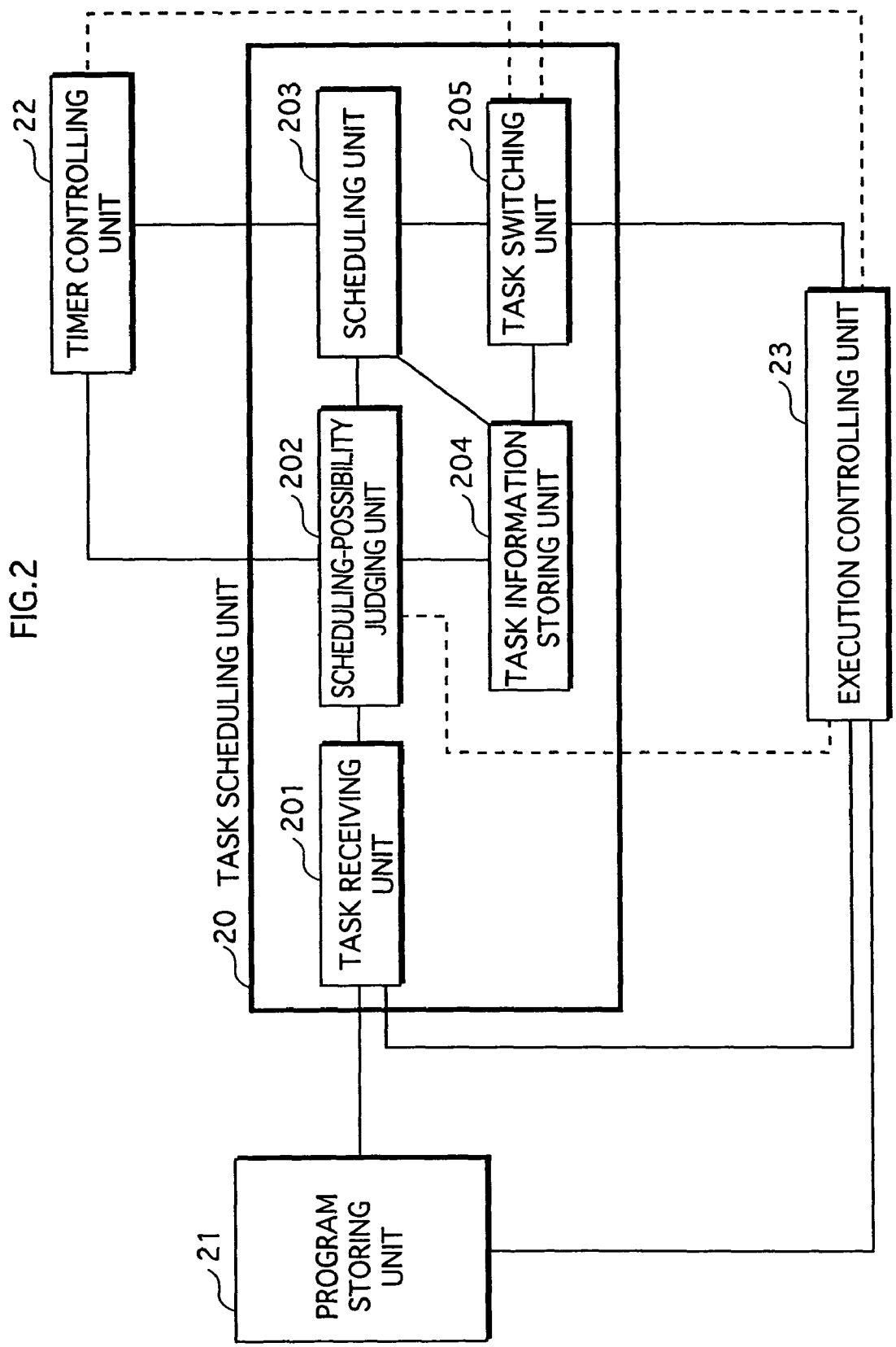
FIG. 2 is a block diagram showing the function of a task scheduling unit 20.

For the purpose of task scheduling, the mobile telephone 1 includes a task scheduling unit 20, a program storing unit 21, a timer controlling unit 22, and an execution controlling unit 23 as shown in FIG. 2. Also, the task scheduling unit 20 includes a task receiving unit 201, a scheduling-possibility judging unit 202, a scheduling unit 203, a task information storing unit 204, and a task switching unit 205.

The task scheduling unit 20, the program storing unit 21, the timer controlling unit 22, and the execution controlling unit 23 are specifically realized by the above-described timer circuit 17, memory 15, CPU 18, and the like. The memory 15 stores a computer program for task scheduling. The functions of the task scheduling unit 20, the program storing unit 21, the timer controlling unit 22, and the execution controlling unit 23 are realized by the CPU 18 operating in accordance with the computer program for task scheduling stored in the memory 15.

Among these components, the program storing unit 21, the timer controlling unit 22, and the execution controlling unit 23 are well known as relating to conventional techniques, and therefore are not described in the present embodiment. The following particularly describes the task scheduling unit 20.

(1) Task Receiving Unit 201

The task receiving unit 201 receives a task that has been generated in accordance with a user operation or the like. To be more specific, the task receiving unit 201 receives a signal indicating a request to execute a task, from the execution controlling unit 23. The task receiving unit 201 then reads, from the program storing unit 21, "task information", "prior-ity level", "deadline time (hereafter, "DL time")", and "worst-case execution period" corresponding to the received task.

The "task information" is made up of a program start address and a stack pointer. The program start address is an address indicating a position at which the task has been written. The stack pointer is a pointer indicating a position at which the status of the task is temporarily stacked.

The "priority level" is one type of priority that serves as a criterion for determining a rank of the task in the execution sequence. The priority level is specifically a numerical value expressing the criterion. In the present embodiment, the priority level is a numerical value indicating one of three levels "high", "middle", and "low".

The "DL time" is a target time before which execution of the task needs to be completed, and is expressed in units of "hour/minute/second/microsecond". In the present embodiment, the "DL time" is another type of priority that provides a criterion for determining a rank of the task in the execution sequence, and is assumed to have precedence over the priority of one type described above, i.e., the "priority level". In the present embodiment, the "DL time" may be referred to as the "first-type priority", and the "priority level" may be referred to as the "second-type priority".

The "worst-case execution period" is a time period that is predicted to take from the start to end of execution of the task.

The task receiving unit 201 outputs the read "task information", "priority level", "DL time", and "worst-case execution period" to the scheduling-possibility judging unit 202.

(2) Task Information Storing Unit 204

Figure 3:
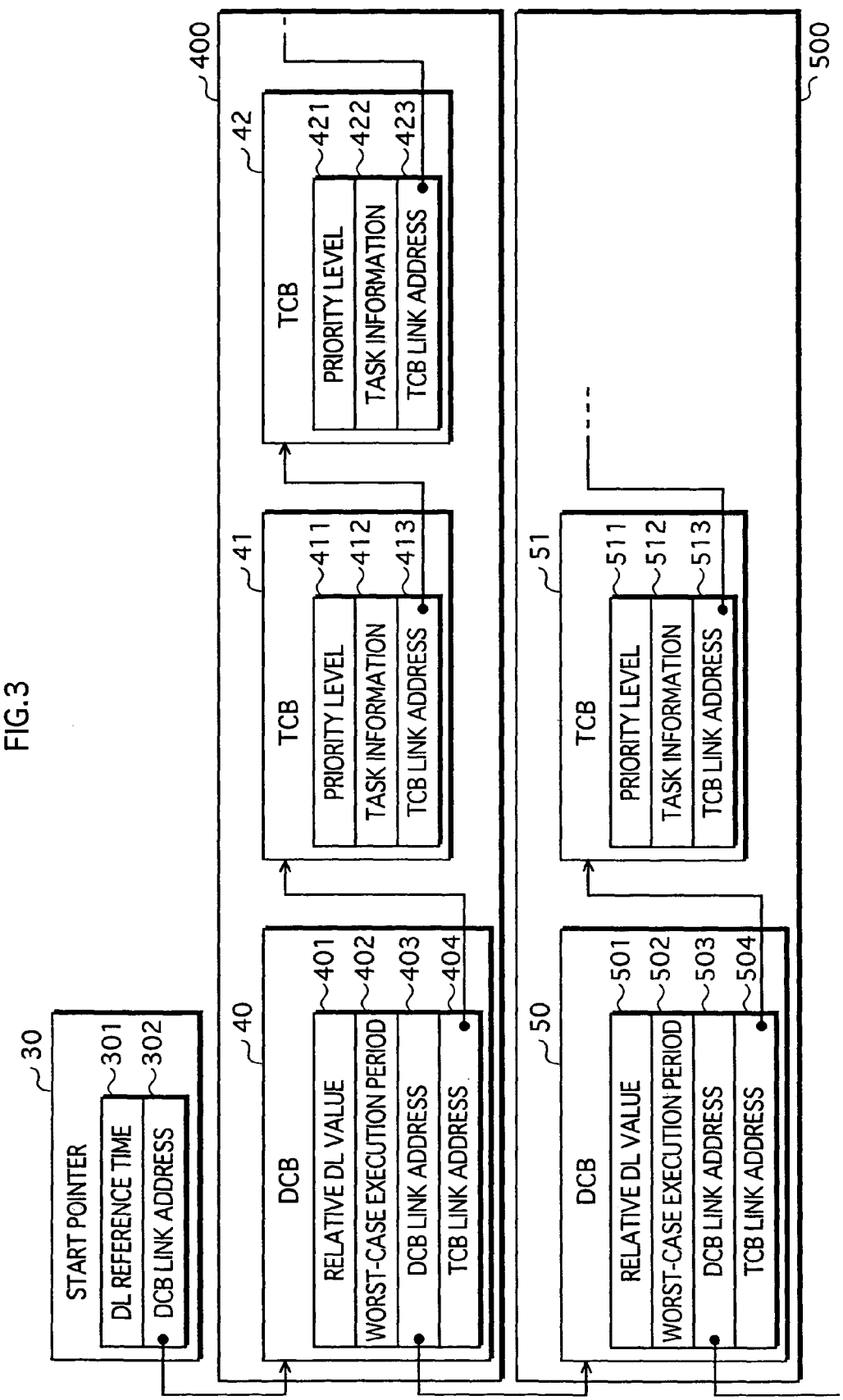
FIG. 3 is a block diagram showing a scheduling status in a task information storing unit 204.

The task information storing unit 204 manages the "DL time" and "priority level" set for each task. As shown in FIG. 3, the task information storing unit 204 includes a start pointer 30, a group 400, a group 500, and other groups.

In the task information storing unit 204, the start pointer 30, the group 400, the group 500, and other groups form an arrangement sequence in the stated order, with the start pointer 30 being positioned at the start of the sequence.

The group 400 is for collectively managing information about a plurality of tasks for which the same DL time is set. The group 400 is made up of a DCB 40, a TCB 41, a TCB 42, and the like.

In the group 400, the DCB 40, the TCB 41, the TCB 42, and the like form an arrangement sequence in the stated order, with the DCB 40 being positioned at the start of the sequence. The TCB (Task Control Block) is management information for managing a task. One TCB corresponds to one task. The DCB (Deadline Control Block) is management information for managing the DL time commonly set for a plurality of tasks managed by a plurality of TCBs included in the group including the DCB.

The start pointer 30 is made up of a "DL reference time" 301 and a "DCB link address" 302. The "DL reference time" 301 is the earliest time of the DL times set for all the tasks whose TCBs are stored in the task information storing unit 204. The "DCB link address" 302 is an address indicating a position at which the DCB 40 included in the group 400 has been written.

The DCB 40 includes a "relative DC value" 401, a "worst-case execution period" 402, a "DCB link address" 403, and a "TCB link address" 404. The "relative DL value" 401 indicates a time period from the DL reference time 301 to the DL time commonly set for tasks managed by the TCBs included in the group 400.

The "worst-case execution period" 402 is a total time period obtained by summing up worst-case execution periods set for tasks managed by all TCBs included in the group 400.

The "DCB link address" 403 is an address indicating a position at which the DCB 50 included in the group 500 has been written. The "TCB link address" 404 is an address indicating a position at which the TCB 41 has been written.

The TCB 41 is made up of a "priority level" 411, "task information" 412, and a "TCB link address" 413. The "priority level" 411 is a value indicating a priority level set for a task managed by the TCB 41. The "task information" 412 is an address indicating a position at which the task managed by the TCB 41 has been written. The "TCB link address" 413 is an address indicating a position at which the TCB 42 has been written.

The TCB 42 is made up of a "priority level" 421, "task information" 422, and a "TCB link address" 423. The "priority level" 421, the "task information" 422, and the "TCB link address" 423 have the same constructions as the "priority level" 411, the "task information" 412, and the "TCB link address" 413 respectively, and therefore are not described here.

The group 500 is made up of a DCB 50, a TCB 51, and the like.

The DCB 50 is made up of a "relative DL value" 501, a "worst-case execution period" 502, a "DCB link address" 503, and a "TCB link address" 504. The "relative DL value 501", the "worst-case execution period" 502, the "DCB link address" 503, and the "TCB link address" 504 have the same constructions as the "relative DL value" 401, the "worst-case execution period" 402, the "DCB link address" 403, and the "TCB link address" 404, respectively, and therefore are not described here.

The TCB 51 is made up of a "priority level" 511, "task information" 512, and a "TCB link address" 513. The "priority level" 511, the "task information" 512, and the "TCB link address" 513 have the same constructions as the "priority" 411, the "task information" 412, and the "TCB link address" 413, respectively, and therefore are not described here.

It should be noted that the start pointer 30, the group 400, the group 500, and other groups form the arrangement sequence in the order of earlier DL times each of which is set commonly for the TCBs included in the corresponding group. As one example, the task information storing unit 204 may store a value indicating a time period from the DL reference time to the DL time "6/35/27", as the relative DL value 401 of the group 400 including the TCB 41. Also, the task information storing unit 204 may store a value indicating a time period from the DL reference time to the DL time "6/35/43", as the relative DL value 501 of the group 500 including the TCB 51.

It should also be noted that the TCB 41, the TCB 42, and the like included in the group 400 form the arrangement sequence in the order of higher priority levels set for these TCBs. As one example, the task information storing unit 204 may store a value indicating "high" in an area for the priority level 411 and a value indicating "middle" in an area for the priority level 421.

Further, the task information storing unit 204 stores an address designating a final DCB, in a DCB link address area included in such a DCB whose sequence includes TCBs for which the latest DL time is set. To be specific, the task information storing unit 204 stores a sequence made up of the final DCB and a plurality of TCBs for which the DL time whose data value is "FF/FF/FF" is set. The TCBs for which the DL time "FF/FF/FF" is set form this sequence in the order determined based upon priority levels (i.e., the second-type priority) set for these TCBs. The data value "FF/FF/FF" is assumed to be a maximum value that can be taken by a predetermined bit sequence constituting the DL time. By setting the DL time set for TCBs at "FF/FF/FF", therefore, the priority of the TCBs can be made the lowest in terms of the first-type priority.

(3) Scheduling-Possibility Judging Unit 202

The scheduling-possibility judging unit 202 judges, when a new task is to be scheduled, whether execution of all tasks that have been scheduled and the newly scheduled task can be completed before the DL time set for each task.

The scheduling-possibility judging unit 202 has variables i, X, and Y. The scheduling-possibility judging unit 202 receives the task information, priority level, DL time, and worst-case execution period corresponding to the new task, and reads the DL reference time included in the start pointer in the task information storing unit 204. Further, the scheduling-possibility judging unit 202 obtains the present time from the timer controlling unit 22.

The scheduling-possibility judging unit 202 repeats n times the following processing from (i) to (v) (where variable i=1, 2, ..., n).

(i) Assign a value indicating the DL reference time to variable X. Assign to variable Y, a value indicating the time at which the new task's worst-case execution period elapses from the present time.

(ii) Read the relative DL value(i) and the worst-case execution period(i) included in the DCB(i) from the task information storing unit 204.

(iii) Assign to variable X, a value obtained by adding a value of variable X and the relative DL value.(i). Assign to variable Y, a value obtained by adding a value of variable Y and the worst-case execution period(i).

(iv) Compare values of variables X and Y.

(v) Assign to variable i, a value obtained by adding a value of variable i and 1.

When detecting $X \leq Y$ in any repetition of comparing values of variables X and Y, i.e., when the DL time is at or before the time at which the worst-case execution period elapses from the present time, the scheduling-possibility judging unit 202 outputs a signal indicating that scheduling is impossible, to the execution controlling unit 23.

On the other hand, when detecting $X > Y$ in all repetitions of comparing values of variables X and Y, i.e., when the DL time is after the time at which the worst-case execution period elapses from the present time, the scheduling-possibility judging unit 202 outputs the task information, priority level, DL time, and worst-case execution period corresponding to the new task, to the scheduling unit 203.

(4) Scheduling Unit 203

The scheduling unit 203 writes a TCB for managing the new task, at a memory position in the task information storing unit 204, determined based upon the DL time and the priority level corresponding to the new task.

The scheduling unit 203 has variables i and T. The scheduling unit 203 receives the task information, priority level, DL time, and worst-case execution period corresponding to the new task from the scheduling-possibility judging unit 202, and reads the DCB link address and the DL reference time included in the start pointer in the task information storing unit 204.

The scheduling unit 203 then assigns 1 to variable i and a value indicating the DL reference time to variable T, and judges whether data of the DCB(1) is present in the storing unit 204. According to the judgment result, the scheduling unit 203 executes processing in the following way.

(i) When the DCB(1) data is not present, the scheduling unit 203 executes processing A (writing into the storing unit 204).

(ii) When the DCB(1) data is present, the scheduling unit 203 compares a value indicating the task's DL time with a value of variable T.

(ii)-1 When the task's DL time<variable T, the scheduling unit 203 executes processing B (writing into the storing unit 204).

(ii)-2 When the task's DL time=variable T, the scheduling unit 203 executes processing E (writing into the storing unit 202).

(ii)-3 When the task's DL time>variable T, the scheduling unit 203 adds 1 to a value of variable i and judges whether the DCB(i) data is present.

(ii)-3-1 When the DCB(i) data is not present, the scheduling unit 203 executes processing C (writing into the storing unit 204).

(ii)-3-2 When the DCB(i) data is present, the scheduling unit 203 reads the relative DL value included in the DCB(i), assigns to variable T, a value obtained by adding a value of variable T and the relative DL value, and compares a value indicating the task's DL time and a value of variable T.

(ii)-3-2-1 When the task's DL time>variable T, the scheduling unit 203 executes processing D (writing into the storing unit 204).

(ii)-3-2-2 When the task's DL time=variable T, the scheduling unit 203 executes processing E (writing into the storing unit 204).

The following describes processing A to processing E in more detail.

[Processing A]

The scheduling unit 203 generates an area for the TCB(a) in the task information storing unit 204, and writes data of the TCB(a) in the generated area. To be more specific, the scheduling unit 203 writes the task's priority level received from the scheduling-possibility judging unit 202 into an area for the priority level of the TCB(a) in the task information storing unit 204, and writes the received task information into an area for the task information of the TCB(a). Further, the scheduling unit 203 assigns a NULL value into an area for the TCB link address of the TCB(a).

Then, the scheduling unit 203 generates an area for the DCB(a) in the task information storing unit 204, and writes data of the DCB(a) in the generated area. To be more specific, the scheduling unit 203 assigns a value 0 into an area for the relative DL value of the DCB(a) in the task information storing unit 204, writes the received worst-case execution period of the task in an area for the worst-case execution period of the DCB(a), assigns a NULL value into an area for the DCB link address of the DCB(a), and writes an address indicating a position of the TCB(a) into an area for the TCB link address of the DCB(a). With this processing, the DCB(a) and the TCB(a) form an arrangement sequence in the stated order in the task information storing unit 204.

Also, the scheduling unit 203 writes the task's DL time over the DL reference time 301 in the task information storing unit 204.

Further, the scheduling unit 203 writes an address indicating a position of the DCB(a) over the DCB link address 302 in the task information storing unit 204. With this processing, the start pointer and the DCB(a) form an arrangement sequence in the stated order in the task information storing unit 204.

The scheduling unit 203 outputs the task's DL time to the timer controlling unit 22.

[Processing B]

The scheduling unit 203 generates an area for the TCB(b) in the task information storing unit 204, and writes data of the TCB(b) in the generated area. To be more specific, the scheduling unit 203 writes the task's priority level received from the scheduling-possibility judging unit 202 into an area for the priority level of the TCB(b) in the task information storing unit 204, and writes the received task information into an area for the task information of the TCB(b). Further, the scheduling unit 203 assigns a NULL value into an area for the TCB link address of the TCB(b).

Also, the scheduling unit 203 generates an area for the DCB(b) in the task information storing unit 204, and writes data of the DCB(b) in the generated area. To be more specific, the scheduling unit 203 assigns a value 0 into an area for the relative DL value of the DCB(b) in the task information storing unit 204, writes the task's worst-case execution period into an area for the worst-case execution period of the DCB(b), and writes an address indicating a position of the DCB(1) into an area for the DCB link address of the DCB(b). With this processing, the DCB(b) and the DCB(1) form an arrangement sequence in the stated order in the task information storing unit 204.

Further, the scheduling unit 203 writes an address indicating a position of the TCB(b) into an area for the TCB link address of the DCB(b). With this processing, the DCB(b) and the TCB(b) form an arrangement sequence in the stated order in the task information storing unit 204.

Also, the scheduling unit 203 writes a value (T—the task's DL time), i.e., a value indicating a time period from the time indicated by a value of variable T to the task's DL time, over the relative DL value of the DCB(1) in the task information storing unit 204, writes the task's DL time over the DL reference time 301, and writes an address indicating a position of the DCB(b) over the DCB link address 302. With this processing, the start pointer and the DCB(b) form an arrangement sequence in the stated order in the task information storing unit 204.

The scheduling unit 203 outputs the task's DL time to the timer controlling unit 22.

[Processing C]

The scheduling unit 203 generates an area for the TCB(c) in the task information storing unit 204, and writes data of the TCB(c) in the generated area. To be more specific, the scheduling unit 203 writes the task's priority level received from the scheduling-possibility judging unit 202 into an area for the priority level of the TCB(c) in the task information storing unit 204, and writes the received task information of the task into an area for the task information of the TCB(c). Further, the scheduling unit 203 assigns a NULL value into an area for the TCB link address of the TCB(c).

Also, the scheduling unit 203 generates an area for the DCB(c) in the task information storing unit 204, and writes data of the DCB (c) in the generated area. To be more specific, the scheduling unit 203 assigns a value (the task's DL time—T), i.e., a value indicating a time period from the task's DL time to the time indicated by a value of variable T, into an area for the relative DL value of the DCB(c), writes the worst-case execution period of the task in the area for the worst-case execution period of the DCB(c), assigns a NULL value into an area for the DCB link address of the DCB(c), and writes an address indicating a position of the TCB(c) into an area for the TCB link address of the DCB(c).

With this processing, the DCB(c) and the TCB(c) form an arrangement sequence in the stated order in the task information storing unit 204.

Further, the scheduling unit 203 writes an address indicating a position of the DCB(c) over the DCB link address of the DCB(i) in the task information storing unit 204. With this processing, the DCB(i) and the DCB(c) form an arrangement sequence in the stated order in the task information storing unit 204.

[Processing D]

The scheduling unit 203 generates an area for the TCB(d) in the task information storing unit 204, and writes data of the TCB(d) in the generated area. To be more specific, the scheduling unit 203 writes the task's priority level received from the scheduling-possibility judging unit 202 into an area for the priority level of the TCB(d) in the task information storing unit 204, and writes the received task information of the task into an area for task information of the TCB(d). Further, the scheduling unit 203 assigns a NULL value into an area for the TCB link address of the TCB(d).

Also, the scheduling unit 203 generates an area for the DCB(d) in the task information storing unit 204, and writes data of the DCB(d) in the generated area. To be more specific, the scheduling unit 203 assigns a value (the task's DL time—T), i.e., a value indicating a time period from the task's DL time to the time indicated by a value of variable T, into an area for the relative DL value of the DCB(d), writes the task's worst-case execution period into an area for the worst-case execution period of the DCB(d), and writes an address indicating a position of the DCB(i) into an area for the DCB link address of the DCB(d). With this processing, the DCB(d) and the DCB(i) form an arrangement sequence in the stated order in the task information storing unit 204.

Further, the scheduling unit 203 writes an address indicating a position of the TCB(d) into an area for the TCB link address of the DCB(d) in the task information storing unit 204. With this processing, the DCB(d) and the TCB(d) form an arrangement sequence in the stated order in the task information storing unit 204.

Further, the scheduling unit 203 writes an address indicating a position of the DCB(d) into an area for the DCB link address of the DCB(i-1) in the task information storing unit 204. With this processing, the DCB(i-1) and the DCB(d) form an arrangement sequence in the stated order in the task information storing unit 204.

[Processing E]

The scheduling unit 203 has variable j. The scheduling unit 203 first sets the initial value of variable j to 1, and then recognizes the TCB(j) designated by the TCB link address included in the DCB (i) in the task information storing unit 204.

Then, the scheduling unit 203 reads the priority level of the TCB(j) from the task information storing unit 204, and compares the task's received priority level with the read priority level of the TCB(j).

When the task's received priority level is lower than or equal to the priority level of the TCB(j), the scheduling unit 203 adds 1 to a value of variable j. Then, the scheduling unit 203 again judges whether the TCB(j) is stored in the task information storing unit 204.

The scheduling unit 203 repeats the process of comparing the task's received priority level with the priority level of the TCB (j), and the process of adding 1 to a value of variable j, as long as judging that the TCB(j) is stored in the task information storing unit 204.

When judging that the TCB(j) is not stored in the task information storing unit 204 anymore, or when the task's received priority level is higher than the priority level of the TCB(j), the scheduling unit 203 generates an area for the TCB(e) in the task information storing unit 204 and writes data of the TCB(e) in the generated area.

To be more specific, the scheduling unit 203 writes the task's priority level received from the scheduling-possibility judging unit 202 into an area for the priority of the TCB(e), writes the received task information into an area for the task information of the TCB(e), and writes an address indicating a position of the TCB(j) into an area for the TCB link address of the TCB(e).

With this processing, the TCB(e) and the TCB(j) form an arrangement sequence in the stated order in the task information storing unit 204.

Following this, the scheduling unit 203 writes an address indicating a position of the TCB(e) into an area for the TCB link address of the TCB(j-1) in the task information storing unit 204. With this processing, the TCB(j-1) and the TCB(e) form an arrangement sequence in the stated order in the task information storing unit 204.

The scheduling unit 203 then reads the worst-case execution period from an area for the worst-case execution period of the DCB(i) in the task information storing unit 204, and writes a value obtained by adding the read worst-case execution period and the task's received worst-case execution period over the worst-case execution period of the DCB(i) in the task information storing unit 204.

(5) Task Switching Unit 205

The task switching unit 205 switches tasks to be executed by the CPU 18.

Upon receipt of a time-out signal from the timer controlling unit 22, the task switching unit 205 executes processing F of switching between tasks.

The task switching unit 205 reads the TCB link address 413 included in the TCB 41 in the task information storing unit 204 when receiving an end signal from the execution controlling unit 23. Further, the task switching unit 205 judges whether the read TCB link address 413 is a NULL value.

The task switching unit 205 executes processing F of switching between tasks when a value of the TCB link address 413 is a NULL value.

On the other hand, the task switching unit 205 executes processing G of switching between tasks when a value of the TCB link address 413 is not a NULL value.

The following describes processing F and processing G in detail.

[Processing F]

The task switching unit 205 reads the start pointer 30, the DCB 40, and the DCB 50 from the task information storing unit 204, and writes a value indicating the time at which a time period indicated by the relative DL value included in the DCB 50 elapses from the DL reference time presently stored in the start pointer 30, over the DL reference time 301 in the task information storing unit 204. The task switching unit 205 then writes an address indicating a position of the DCB 50 over the DCB link address 302 in the task information storing unit 204, and further writes a value 0 over the relative DL value 501 included in the DCB 50.

Also, the task switching unit 205 deletes the DCB 40 and all TCBs linked to the DCB 40 from the task information storing unit 204.

Following this, the task switching unit 205 reads, from the task information storing unit 204, the TCB 51 designated by the TCB link address included in the DCB 50, and outputs the task information 512 included in the read TCB 51 to the execution controlling unit 23.

[Processing G]

The task switching unit 205 reads the DCB 40, the TCB 41, and the TCB 42 from the task information storing unit 204, and writes an address indicating a position of the TCB 42 over the TCB link address 404 included in the DCB 40.

Following this, the task switching unit 205 deletes the TCB 41 from the task information storing unit 204, and outputs the task information 422 included in the TCB 42 to the execution control unit 23.

[3] Operation of the Task Scheduling Unit 20

Figure 4:
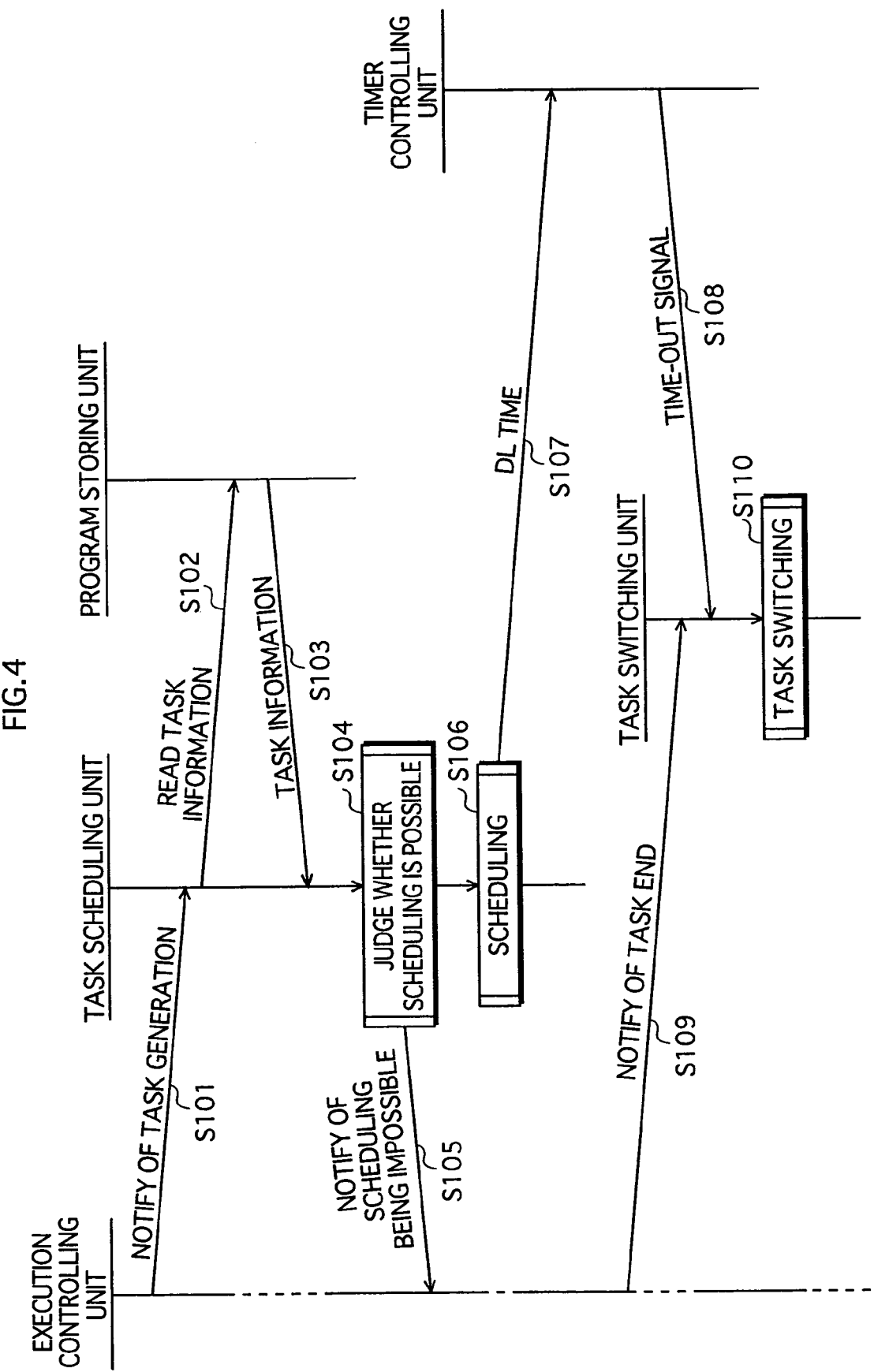
FIG. 4 is a sequence diagram showing a task scheduling operation executed by the task scheduling unit 20.

The following describes the operation of the task scheduling unit 20, with reference to a sequence diagram shown in FIG. 4.

The execution controlling unit 23 notifies the task receiving unit 201 that a new task has been generated (step S101).

The task scheduling unit 20 transmits an address indicating a position of the new task in the program storing unit 21 (step S102), and reads task information of the new task (step S103). Based upon the read task information, the task scheduling unit 20 judges whether the new task can be scheduled (step S104).

When judging that the new task cannot be scheduled, the task scheduling unit 20 outputs a signal indicating that the scheduling is impossible, to the execution controlling unit 23 (step S105).

When judging that the new task can be scheduled, the task scheduling unit 20 performs scheduling of the new task (step S106). Here, if the DL reference time 301 included in the start pointer 30 is to be changed, the task scheduling unit 20 outputs the DL time of the new task to the timer controlling unit 22 (step S107).

The task switching unit 205 receives a time-out signal from the timer controlling unit 22 (step S108), and a task end signal from the execution controlling unit 23 (step S109), and then performs switching between tasks (step S110).

(1) Scheduling Possibility Judgment Process

Figure 5:
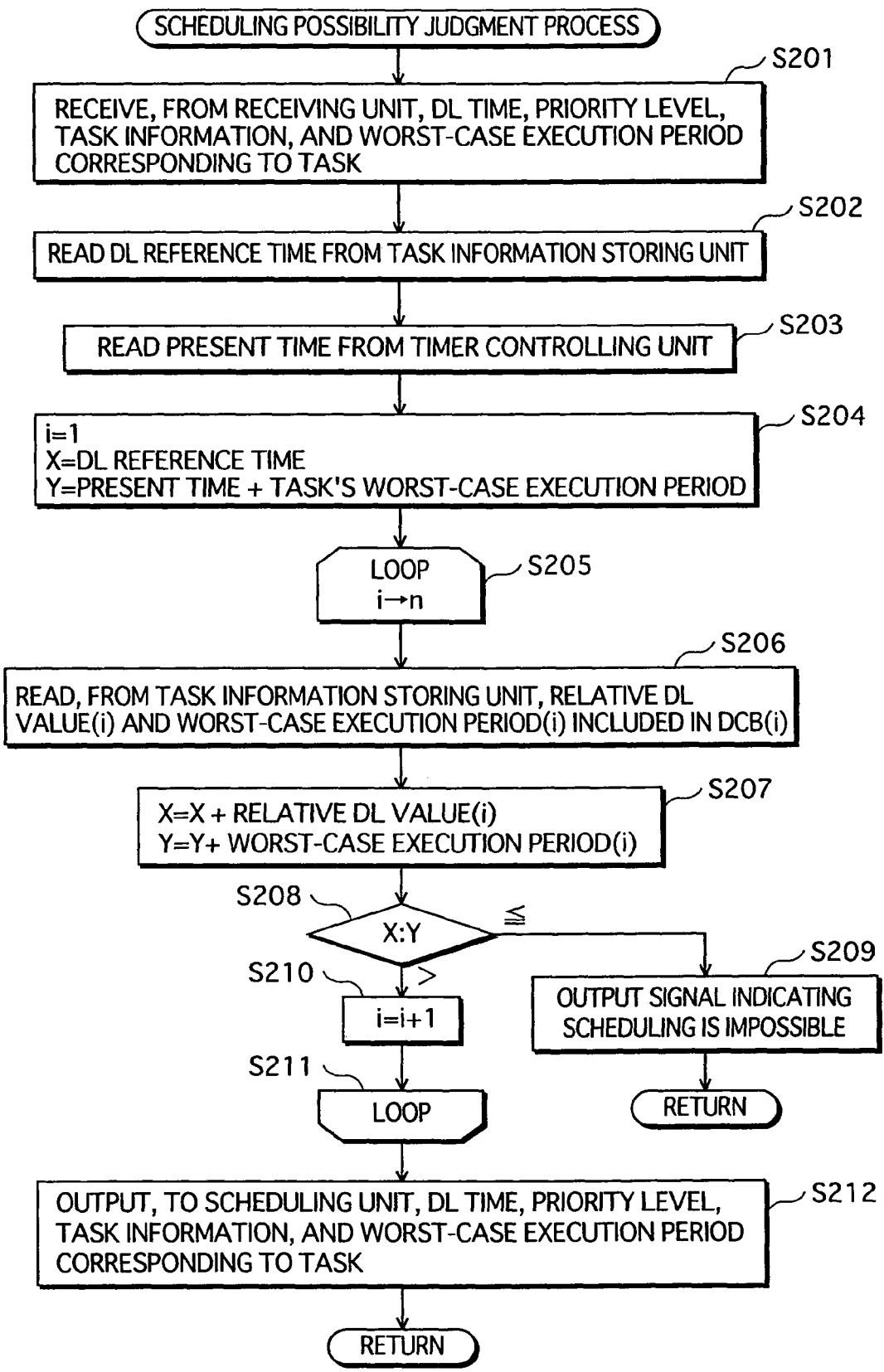
FIG. 5 is a flowchart showing a scheduling possibility judgment process.

The following describes a scheduling possibility judgment process, with reference to the flowchart shown in FIG. 5.

The scheduling-possibility judging unit 202 receives the task information, priority level, DL time, and worst-case execution period corresponding to the new task, from the task receiving unit 201 (step S201), reads the DL reference time from the task information storing unit 204 (step S202), and obtains the present time from the timer controlling unit 22 (step S203).

Following this, the scheduling-possibility judging unit 202 assigns 1 to variable i, a value indicating the DL reference time to variable X, and a value indicating the time at which the worst-case execution period elapses from the present time to variable Y (step S204).

Then, until a value of variable i reaches n, the scheduling-possibility judging unit 202 repeats the processing from steps S206 to S210 (step S205).

To be more specific, the scheduling-possibility judging unit 202 reads the relative DL value(i) and the worst-case execution period(i) included in the DCB(i) from the task information storing unit 204 (step S206), assigns a value obtained by adding a value of variable X and the relative DL value(i), to variable X, and assigns a value obtained by adding a value of variable Y and the worst-case execution period(i), to variable Y (step S207).

The scheduling-possibility judging unit 202 compares values of variables X and Y (step S208).

When $X \leq Y$ ("$\leq$" in step S208), the scheduling-possibility judging unit 202 outputs a signal indicating that the scheduling is impossible, to the execution controlling unit 23 (step S209). When X>Y (">" in step S208), the scheduling-possibility judging unit 202 assigns a value obtained by adding a value of variable i and 1, to variable i (step S210), and repeats the above processing from steps S206 to S210 (step S211).

After completing this loop processing, the scheduling-possibility judging unit 202 outputs the task information, priority level, DL time, and worst-case execution period corresponding to the new task, to the scheduling unit 203 (step S212).

(2) Scheduling Process

Figure 6:
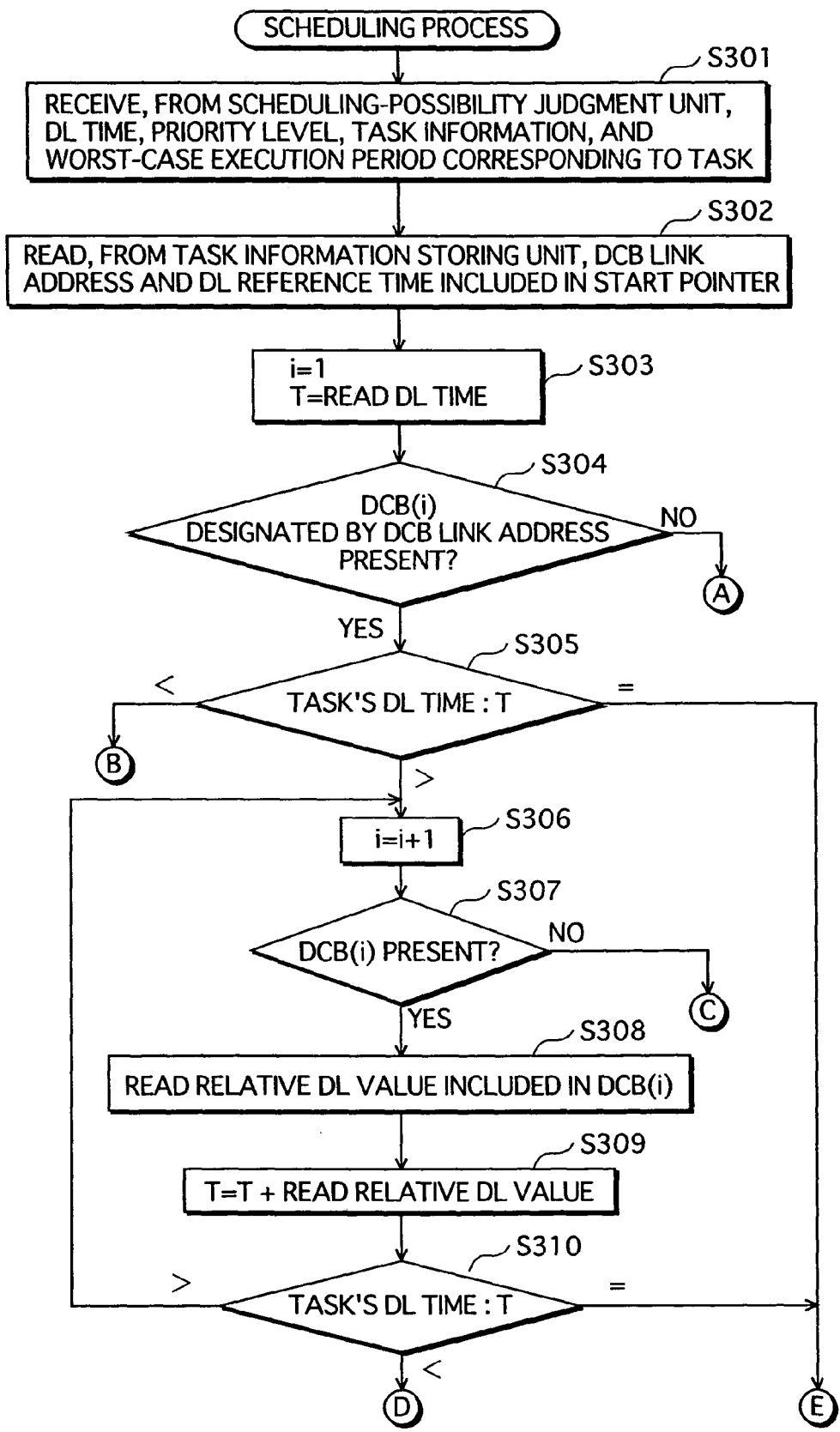
FIG. 6 is a flowchart showing a scheduling process.

The following describes a scheduling process, with reference to the flowchart shown in FIG. 6.

The scheduling unit 203 receives the task information, priority level, DL time, and worst-case execution period corresponding to the new task, from the scheduling-possibility judging unit 202 (step S301), and reads the DCB link address and the DL reference time included in the start pointer, from the task information storing unit 204 (step S302).

Then, the scheduling unit 203 assigns 1 to variable i, and a value indicating the DL reference time to variable T (step S303).

As i=1, the scheduling unit 203 judges whether the DCB(1) is present (step S304). When judging that the DCB(1) is not present ("NO" in step S304), the scheduling unit 203 executes processing A (see FIG. 7). When judging that the DCB(1) is present ("YES" in step S304), the scheduling unit 203 compares a value indicating the task's DL time and a value of variable T (step S305).

Figure 8:
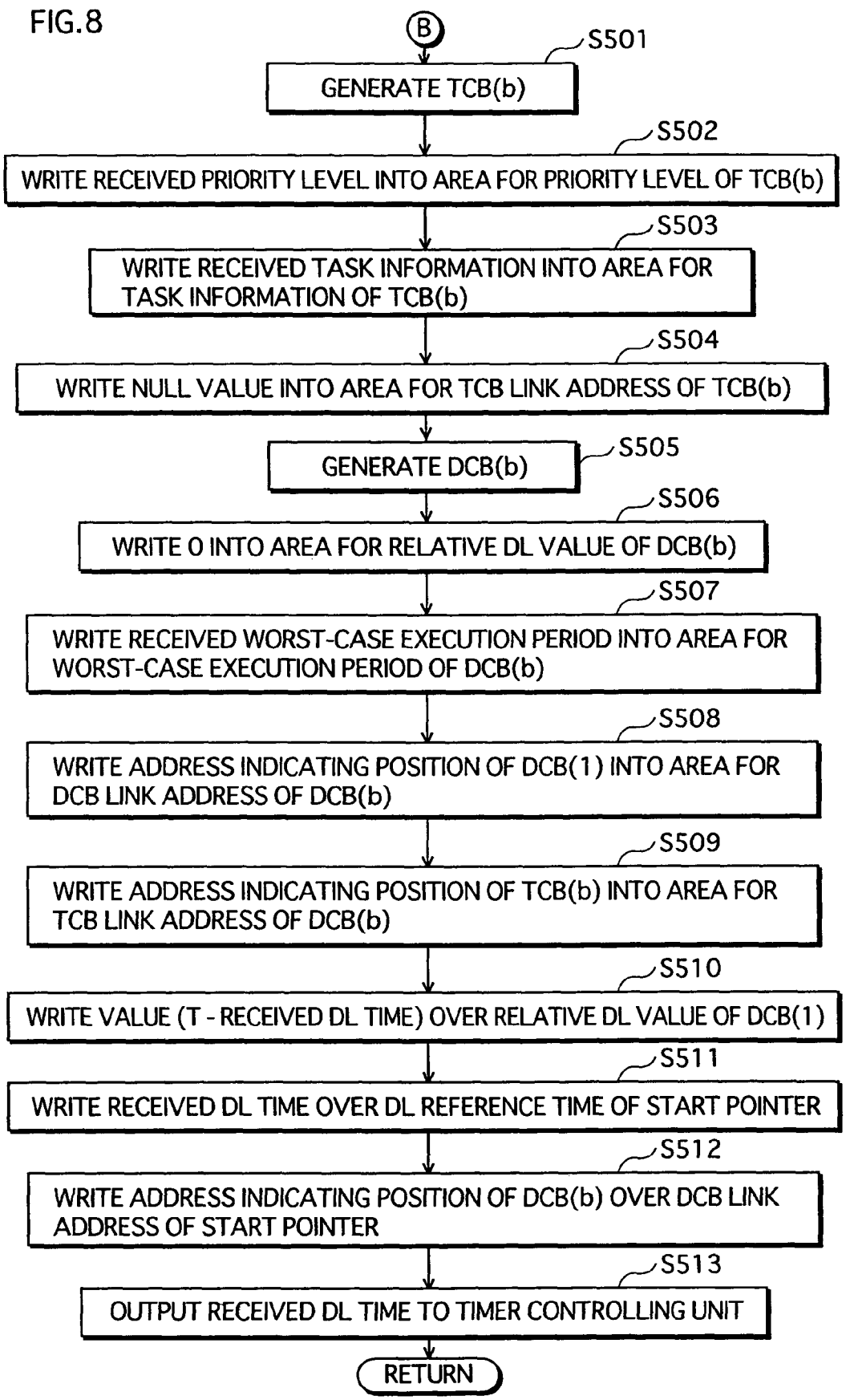
FIG. 8 is a flowchart showing processing B.

When the task's DL time<variable T ("<" in step S305), the scheduling unit 203 executes processing B (see FIG. 8). On the other hand, when the task's DL time=variable T ("=" in step S305), the scheduling unit 203 executes processing E (see FIG. 11).

Further, when the task's DL time>variable T (">" in step S305), the scheduling unit 203 assigns a value obtained by adding a value of variable i and 1, to variable i (step S306), and judges whether the DCB(i) is present (step S307).

Figure 9:
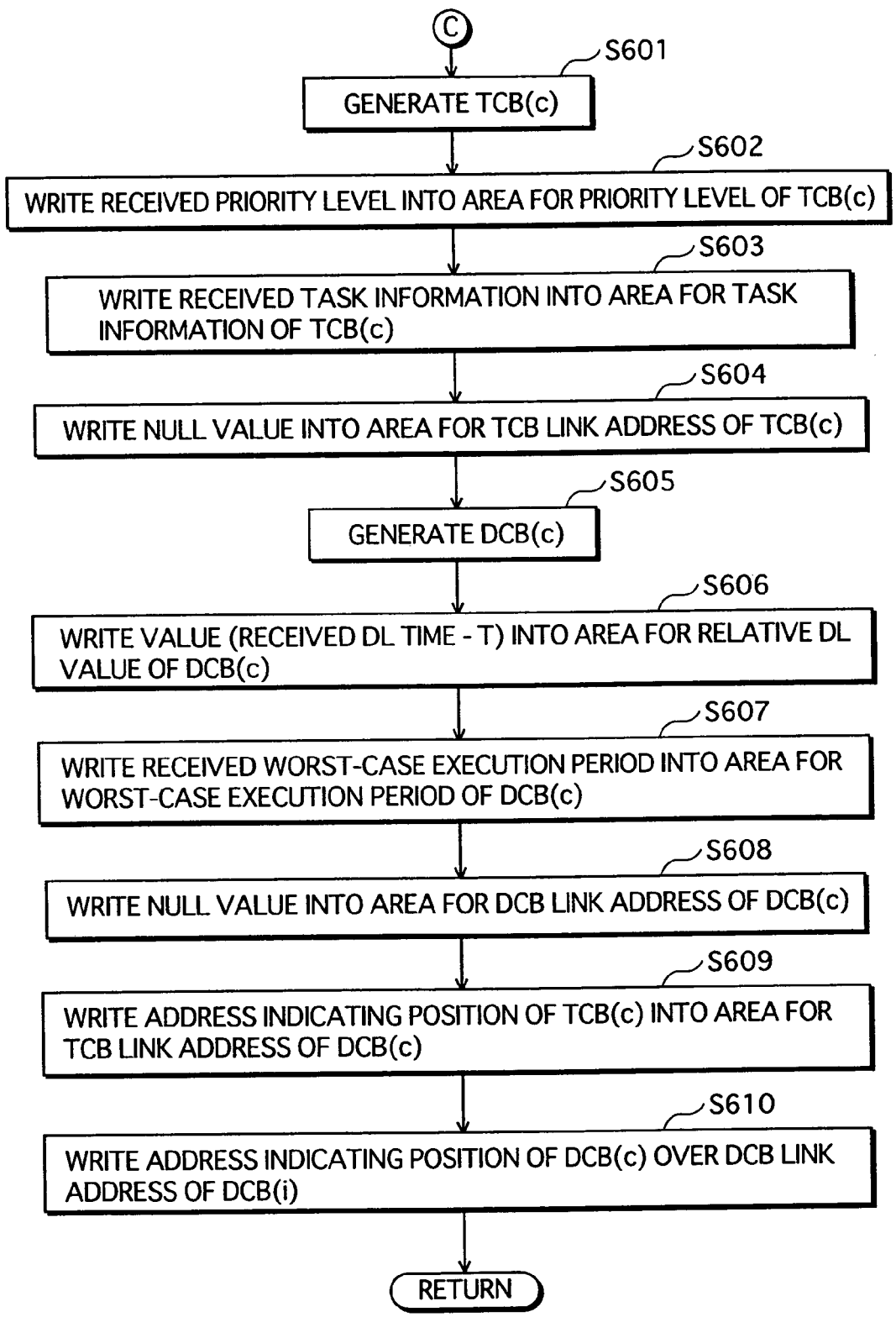
FIG. 9 is a flowchart showing processing C.

When judging that the DCB(i) is not present ("NO" in step S307), the scheduling unit 203 executes processing C (see FIG. 9). On the other hand, when judging that the DCB(i) is present ("YES" in step S307), the scheduling unit 203 reads the relative DL value included in the DCB(i) (step S308), assigns a value obtained by adding a value of variable T and the relative DL value, to variable T (step S309), and compares a value indicating the task's DL time and a value of variable T (step S310).

Figure 10:
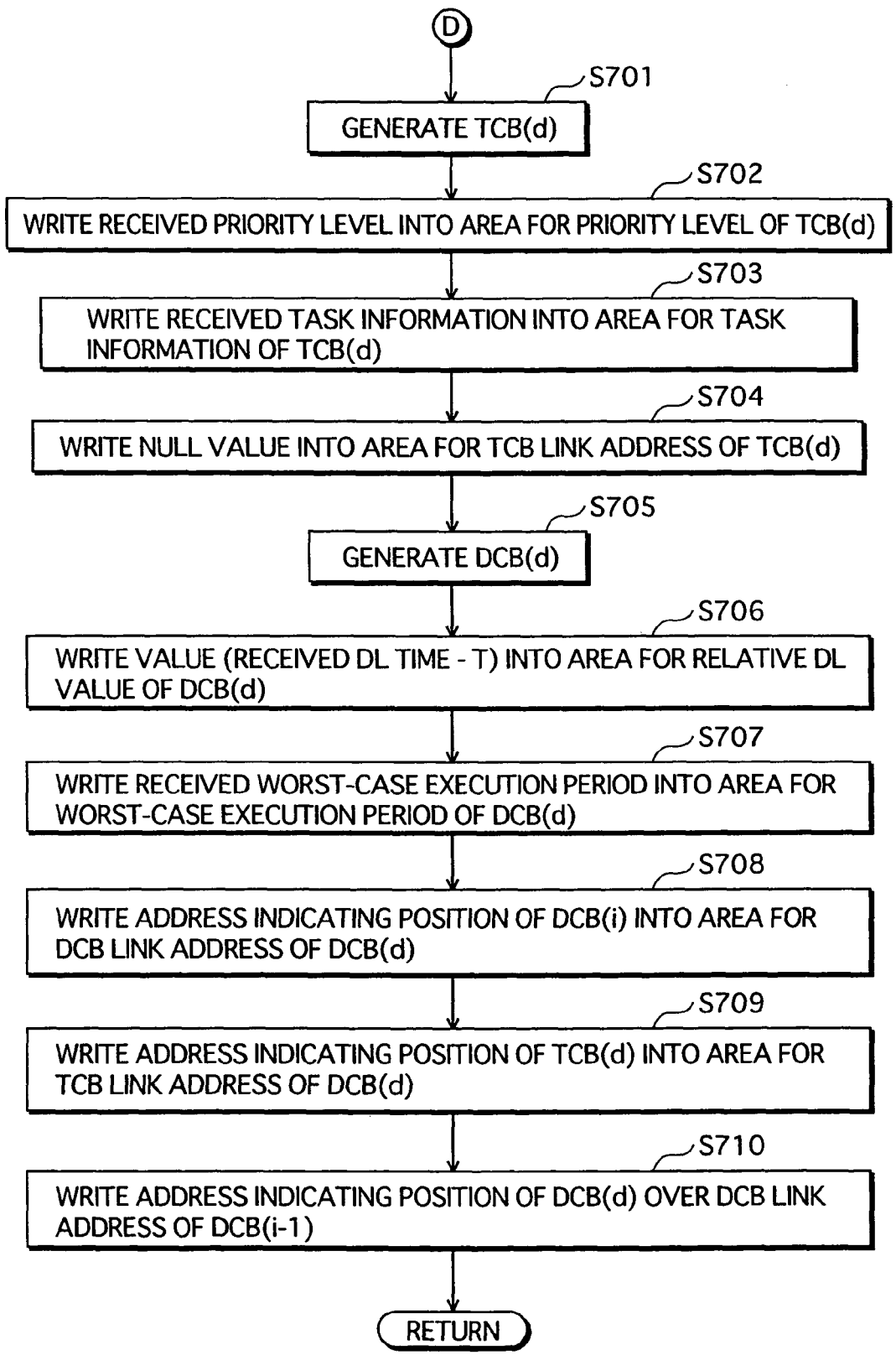
FIG. 10 is a flowchart showing processing D.

When the task's DL time<variable T ("<" in step S310), the scheduling unit 203 executes processing D (see FIG. 10).

On the other hand, when the task's DL time=variable T ("=" in step S310), the scheduling unit 203 executes processing E.

When the task's DL time>variable T (">" in step S310), the scheduling unit 203 returns to step S306, and repeats the processing from step S306 to step S310.

(i) Processing A

Figure 7:
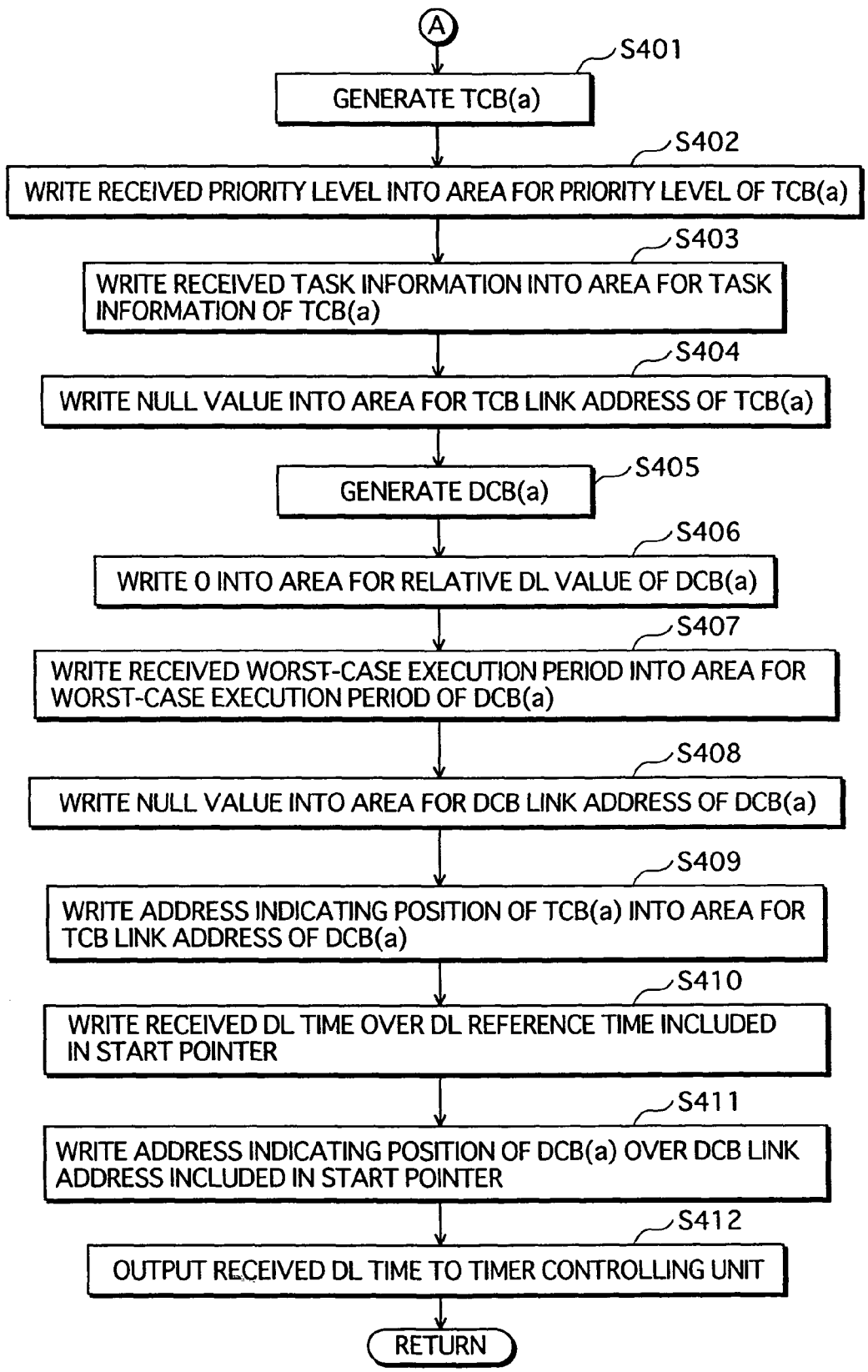
FIG. 7 is a flowchart showing processing A.

The following describes processing A, with reference to the flowchart shown in FIG. 7.

The scheduling unit 203 generates an area for the TCB(a) in the task information storing unit 204 (step S401), writes the task's priority level into an area for the priority level of the TCB(a) (step S402), writes the task's task information into an area for the task information of the TCB(a) (step S403), and assigns a NULL value into an area for the TCB link address of the TCB(a) (step S404).

The scheduling unit 203 generates an area for the DCB(a) in the task information storing unit 204 (step S405), assigns a value 0 into an area for the relative DL value of the DCB(a) (step S406), writes the task's worst-case execution period into an area for the worst-case execution period of the DCB(a) (step S407), assigns a NULL value into an area for the DCB link address of the DCB(a) (step S408), and writes an address indicating a position of the TCB(a) into an area for the TCB link address of the DCB(a) (step S409).

Following this, the scheduling unit 203 writes the task's DL time over the DL reference time 301 in the task information storing unit 204 (step S410), and writes an address indicating a position of the DCB(a) over the DCB link address 302 (step S411). Further, the scheduling unit 203 outputs the task's DL time to the timer controlling unit 22 (step S412).

(ii) Processing B

The following describes processing B, with reference to the flowchart shown in FIG. 8.

The scheduling unit 203 generates an area for the TCB(b) in the task information storing unit 204 (step S501), writes the task's priority level into an area for the priority level of the TCB(b) (step S502), writes the task's task information into an area for the task information of the TCB(b) (step S503), and assigns a NULL value into an area for the TCB link address of the TCB(b) (step S504).

The scheduling unit 203 generates an area for the DCB(b) in the task information storing unit 204 (step S505), assigns a value 0 into an area for the relative DL value of the DCB(b) (step S506), writes the task's worst-case execution period into an area for the worst-case execution period of the DCB (b) (step S507), writes an address indicating a position of the DCB(1) into an area for the DCB link address of the DCB(b) (step S508), and writes an address indicating a position of the TCB(b) into an area for the TCB link address of the DCB(b) (step S509).

Following this, the scheduling unit 203 writes a value (T—the task's DL time), i.e., a value indicating a time period from the time indicated by a value of variable T to the task's DL time, over the relative DL value of the DCB(1) (step S510), writes the task's DL time over the DL reference time 301 in the task information storing unit 204 (step S511), and writes an address indicating a position of the DCB(b) over the DCB link address 302 (step S512).

Following this, the scheduling unit 203 outputs the task's DL time to the timer controlling unit 22 (step S513).

(iii) Processing C

The following describes processing C, with reference to the flowchart shown in FIG. 9.

The scheduling unit 203 generates an area for the TCB(c) in the task information storing unit 204 (step S601), writes the task's priority level into an area for the priority level of the TCB(c) (step S602), writes the task's task information into an area for the task information of the TCB(c) (step S603), and assigns a NULL value into an area for the TCB link address of the TCB(c) (step S604).

The scheduling unit 203 generates an area for the DCB(c) in the task information storing unit 204 (step S605), assigns a value (the task's DL time—T), i.e., a value indicating a time period from the task's DL time to the time indicated by a value of variable T, into an area for the relative DL value of the DCB(c) (step S606), writes the task's worst-case execution period into an area for the worst-case execution period of the DCB(c) (step S607), writes a NULL value into an area for the DCB link address of the DCB(c) (step S608), and writes an address indicating a position of the TCB(c) into an area for the TCB link address of the DCB(c) (step S609)

Following this, the scheduling unit 203 writes an address indicating a position of the DCB(c) into an area for the DCB link address of the DCB(i) (step S610).

(iv) Processing D

The following describes processing D, with reference to the flowchart shown in FIG. 10.

The scheduling unit 203 generates an area for the TCB(d) in the task information storing unit 204 (step S701), writes the task's priority level into an area for the priority level of the TCB(d) (step S702), writes the task's task information into an area for the task information of the TCB(d) (step S703), and assigns a NULL value into an area for the TCB link address of the TCB(d) (step S704).

The scheduling unit 203 then generates an area for the DCB(d) in the task information storing unit 204 (step S705), assigns a value (the task's DL time—T), i.e., a value indicating a time period from the task's DL time to the time indicated by a value of variable T, into an area for the relative DL value of the DCB(d) (step S706), writes the task's worst-case execution period into an area for the worst-case execution period of the DCB(d) (step S707), writes an address indicating a position of the DCB(i) into an area for the DCB link address of the DCB(d) (step S708), and writes an address indicating a position of the TCB(d) into an area for the TCB link address of the DCB(d) (step S709).

Following this, the scheduling unit 203 writes an address indicating a position of the DCB(d) into an area for the DCB link address of the DCB(i−1) (step S710).

(v) Processing E

Figure 11:
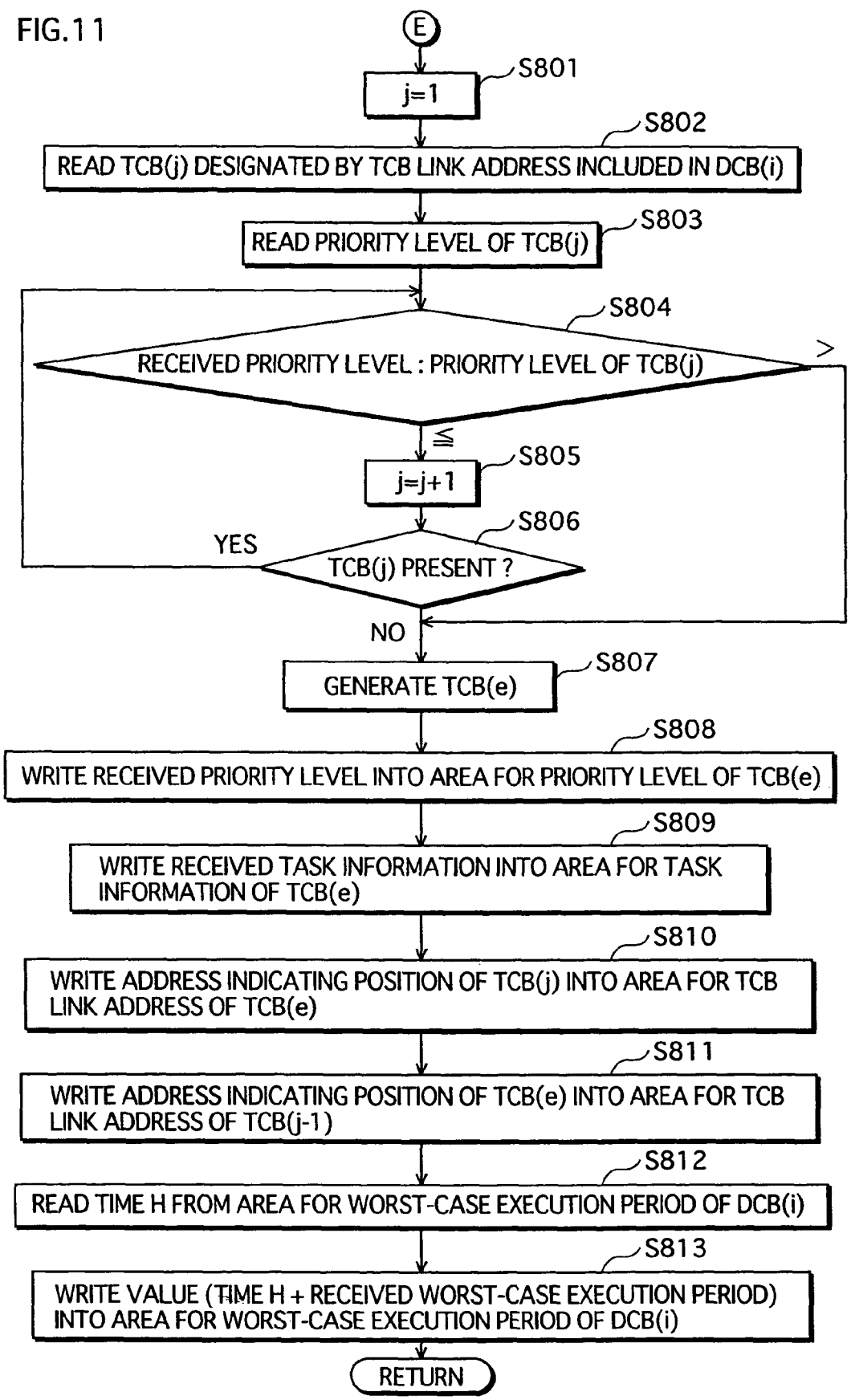
FIG. 11 is a flowchart showing processing E.

The following describes processing E, with reference to the flowchart shown in FIG. 11.

The scheduling unit 203 has variable j. The scheduling unit 203 sets the initial value of variable j to 1 (step S801), recognizes the TCB(j) designated by the TCB link address included in the DCB(i) in the task information storing unit 204 (step S802), and reads the priority level of the TCB(j) (step S803).

Following this, the scheduling unit 203 compares the task's priority level and the priority level of the TCB(j) (step S804).

When the task's priority level≦the priority level of the TCB(j) ("≦" in step S804), the scheduling unit 203 adds 1 to a value of variable j (step S805), and judges whether the TCB(j) is present (step S806).

When judging that the TCB(j) is present ("YES" in step S806), the scheduling unit 203 returns to step S804.

On the other hand, when judging that the TCB(j) is not present ("NO" in step S806), or when judging that the task's priority level>the priority level of the TCB(j) (">" in step S804), the scheduling unit 203 generates an area for the TCB(e) in the task information storing unit 204 (step S807), writes the task's priority level into an area for the priority level of the TCB(e) (step S808), writes the task's task information into an area for the task information of the TCB(e) (step S809), and writes an address indicating a position of the TCB(j) into an area for the TCB link address of the TCB(e) (step S810).

Following this, the scheduling unit 203 writes an address indicating a position of the TCB(e) into an area for the TCB link address of the TCB(j−1) (step S811), reads a value indicating the time H from the area for the worst-case execution period of the DCB(i) (step S812); and writes a value obtained by adding the read value indicating the time H and the task's worst-case execution period into an area for the worst-case execution period of the DCB(i) (step S813).

(3) Task Switching Process

Figure 12:
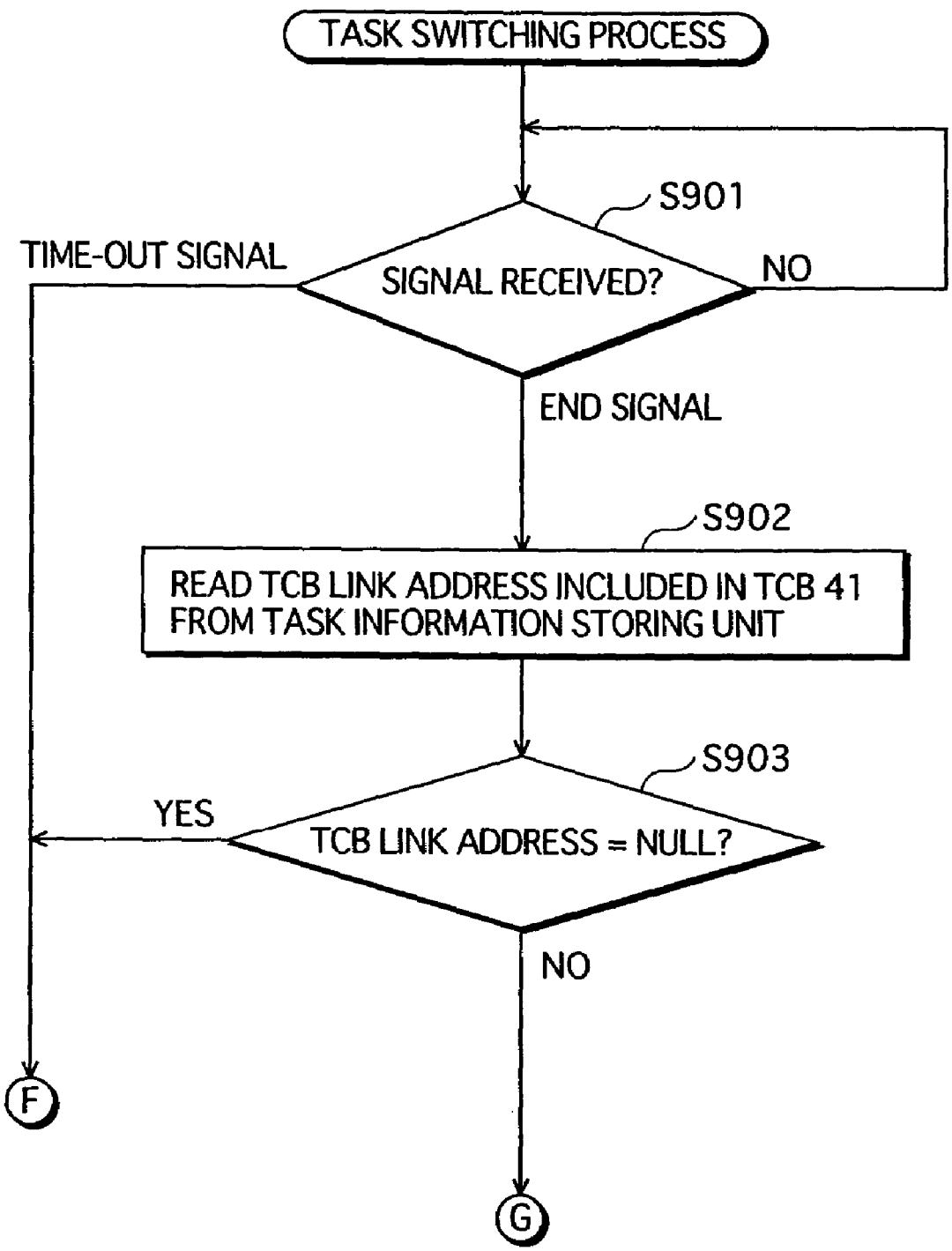
FIG. 12 is a flowchart showing a task switching process.

The following describes a task switching process, with reference to the flowchart shown in FIG. 12.

The task switching unit 205 analyzes a type of a signal received (step S901).

When the received signal is a time-out signal ("TIME-OUT SIGNAL" in step S901), the task switching unit 205 executes processing F. When the received signal is an end signal ("END SIGNAL" in step S901), the task switching unit 205 reads the TCB link address 413 included in the TCB 41 (step S902), and judges whether a value of the read TCB link address 413 is a NULL value (step S903).

When judging that the value of the TCB link address 413 is a NULL value ("YES" in step S903), the task switching unit 205 executes processing F. When judging that the value of the TCB link address is not a NULL value ("NO" in step S903), the task switching unit 205 executes processing G.

(i) Processing F

Figure 13:
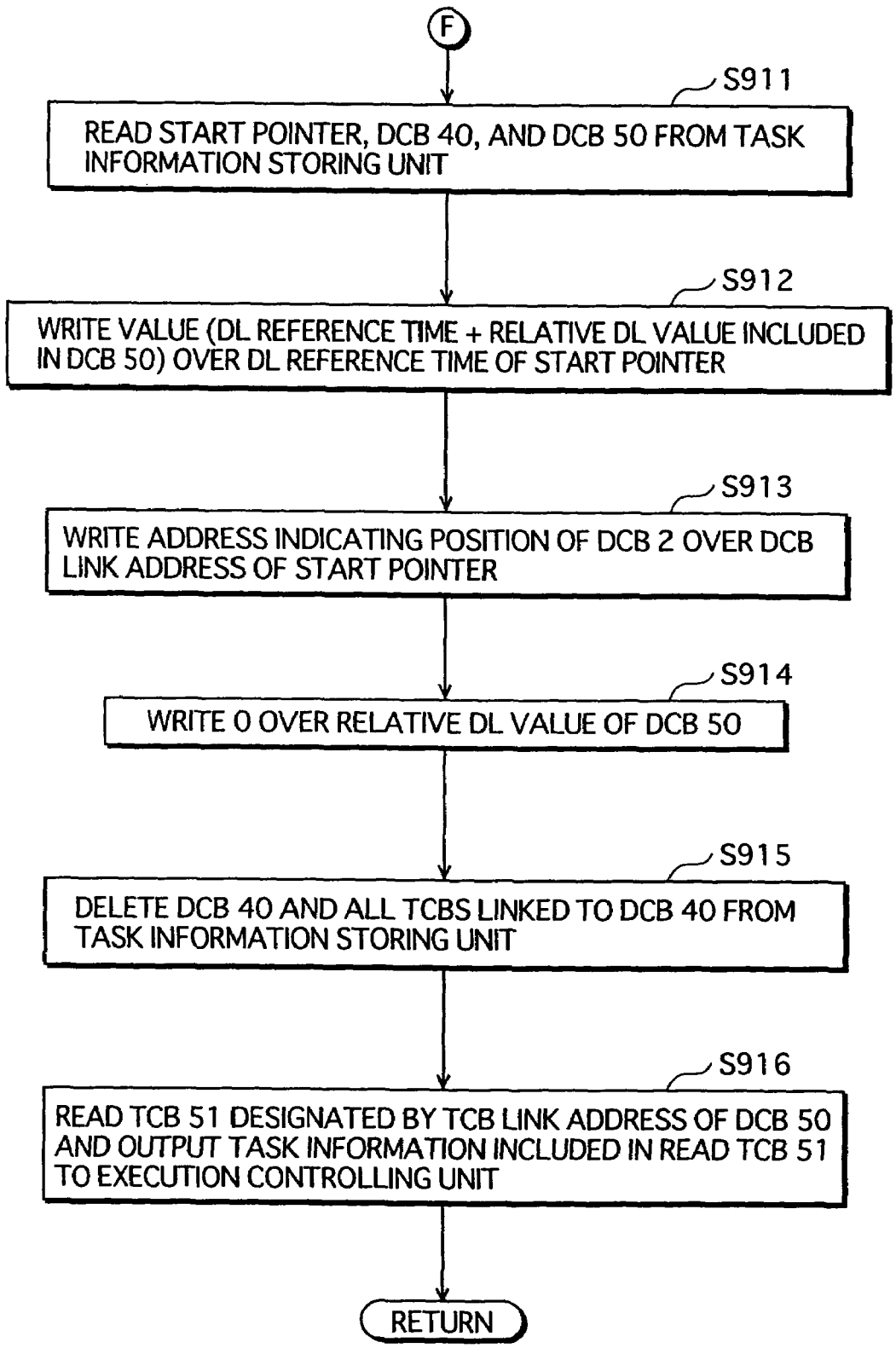
FIG. 13 is a flowchart showing processing F.

The following describes processing F, with reference to the flowchart shown in FIG. 13.

The task switching unit 205 reads the start pointer, the DCB 40, and the DCB 50 from the task information storing unit 204 (step S911), and writes a value obtained by adding a value indicating the DL reference time and the relative DL value included in the DCB 50, over the DL reference time of the read start pointer (step S912).

Following this, the task switching unit 205 writes an address indicating a position of the DCB 50 over the DCB link address of the start pointer (step S913), and writes 0 over the relative DL value of the DCB 50 (step S914).

The task switching unit 205 then deletes the DCB 40 and all TCBs linked to the DCB 40 from the task information storing unit 204 (step S915), reads the TCB 51 designated by the TCB link address of the DCB 50, and outputs task information included in the read TCB 51 to the execution controlling unit 23 (step S916).

(ii) Processing G

Figure 14:
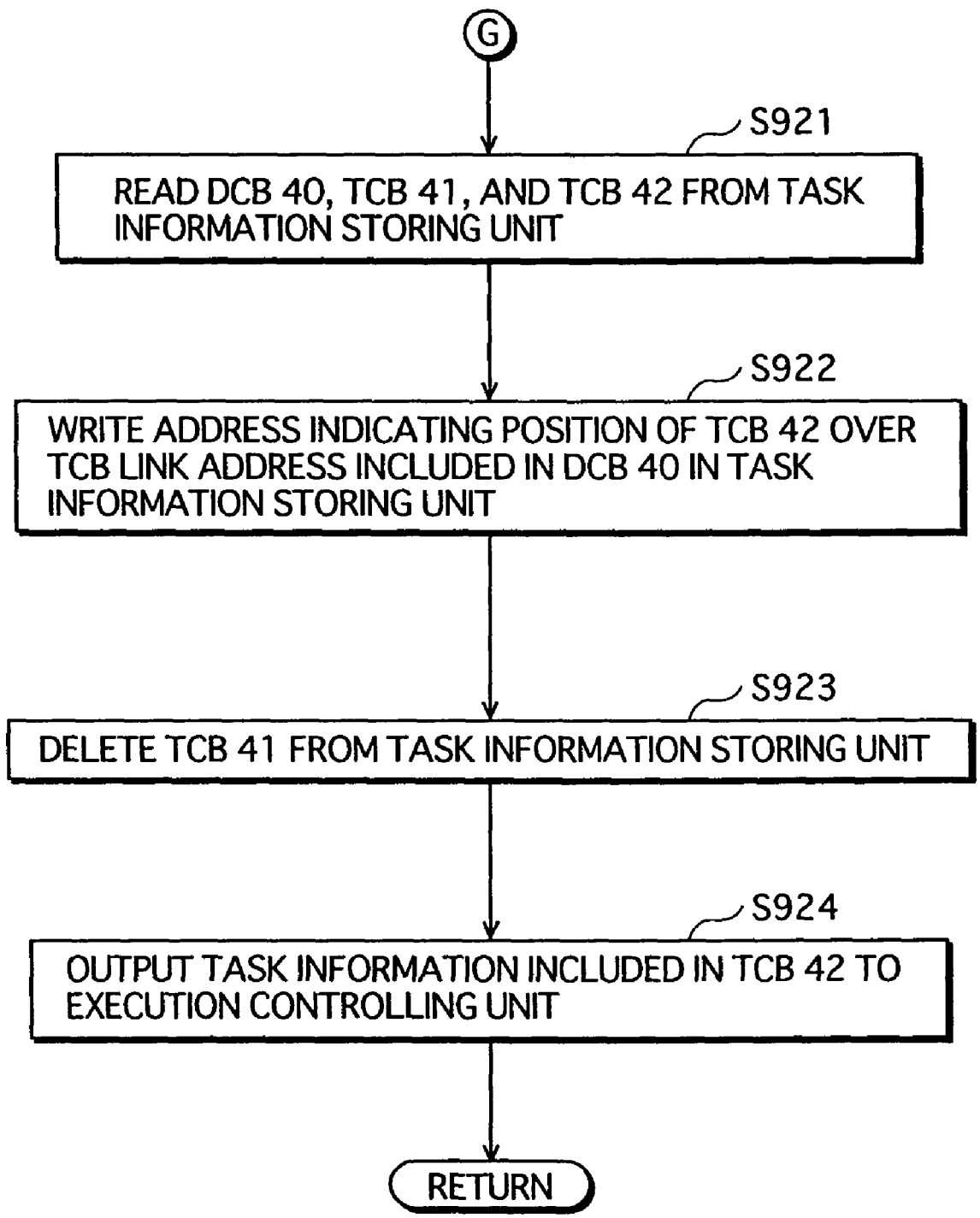
FIG. 14 is a flowchart showing processing G.

The following describes processing G, with reference to the flowchart shown in FIG. 14.

The task switching unit 205 reads the DCB 40, the TCB 41, and the TCB 42 from the task information storing unit 204 (step S921), and writes an address indicating a position of the TCB 42 over the TCB link address included in the DCB 40 (step S922).

Then, the task switching unit 205 deletes the TCB 41 from the task information storing unit 204 (step S923), and outputs task information included in the TCB 42 to the execution controlling unit 23 (step S924).

[4] Other Modifications

Although the present invention is described based upon the above embodiment, the present invention can be embodied by other modifications that do not deviate from the essential concept of the present invention. The following describes examples of such modifications.

(1) Types of priorities set for a task should not be limited to two types, i.e., the DL time and the priority level, employed in the above embodiment. More types of priorities may be employed. It should be noted here that a plurality of types of priorities employed are given a hierarchical relationship among them.

Also, types of priorities set for a task may be only one type, i.e., the DL time. The following describes a task scheduling method, which differs from the scheduling method in the above embodiment, for scheduling tasks for each of which only the one type of priority, i.e., the DL time, is set.

The task information storing unit 204 manages the priority of one type, i.e., the DL time, as two types of priorities, i.e., the first-type priority and the second-type priority. The first-type priority is specifically a value obtained by multiplying a part corresponding to predetermined units of the DL time set for each task by an integer. The second-type priority is specifically a value of the remaining part corresponding to units smaller than the predetermined units of the DL time set for each task. As shown in FIG. 3, the task information storing unit 204 includes the start pointer 30, the group 400, the group 500, and other groups. For example, when the DL time is made up of units of hour/minute/second/millisecond, the first-type priority may be made up of the unit part "hour/minute/second", whereas the second-type priority may be made up of the unit part "millisecond".

The start pointer 30, the group 400, the group 500, and other groups form an arrangement sequence in the stated order, with the start pointer 30 being positioned at the start of the sequence.

The group 400, the group 500, and other groups form an arrangement sequence in the order determined based upon the first-type priority.

The group 400 is for collectively managing information about a plurality of tasks for which the same first-type priority is set. The group 400 is made up of the DCB 40, the TCB 41, the TCB 42, and the like.

The DCB 40, the TCB 41, the TCB 42, and the like form an arrangement sequence in the stated order, with the DCB 40 being positioned at the start of the sequence. The TCB 41, the TCB 42, and the like form an arrangement sequence in the order determined based upon the second-type priority.

The scheduling unit 203 writes a TCB that manages a new task, at a memory position in the task information storing unit 204, determined based upon the first-type priority and the second-type priority set for the new task.

(2) The data structure of the DL time is not limited to the structure being made up of units of hour/minute/second/millisecond employed in the above embodiment, but may be a structure being made up of other appropriate time-units.

(3) Values used as the priority level may not be limited to values indicating three levels, namely, high, middle, and low, but may be other appropriate reference values.

(4) Although the data structure "FF/FF/FF" is employed as the data structure showing the lowest value of the DL time in the above embodiment, other appropriate data values may be employed as such a data structure.

(5) According to the present invention, the task switching unit 205 in the above embodiment may perform exclusive control called "pre-emption".

The following describes such exclusive control performed by the task switching unit 205.

Upon receipt of a time-out signal or an end-signal, the task switching unit 205 reads, from the task information storing unit 204, data stored in an area for the TCB link address of a TCB managing the task that is presently being executed.

The task switching unit 205 judges whether an area for task information of the TCB designated by the read data includes rock information. The rock information is control information indicating whether the task managed by the TCB is in the state where it cannot be executed by exclusive control.

When judging that the area includes the rock information, the task switching unit 205 further reads data stored in the area for the TCB link address of the TCB designated by the read data, and judges whether an area for task information of the TCB designated by the read data includes rock information. The task switching unit 205 repeatedly performs the above reading of data in the TCB link address area and the above judging of whether the task information area includes rock information as long as the judgment result is affirmative.

When judging that the area does not include the rock information, the task switching unit 205 executes the same task switching process as that described in the above embodiment.

(6) The present invention may be realized by methods described in the above embodiment. Also, the present invention may be realized by a computer program executed on a computer for realizing these methods, or by a digital signal representing the computer program.

Also, the present invention may be realized by a computer-readable recording medium on which the computer program or the digital signal is recorded. Examples of the computer-readable recording medium include a ROM, a RAM, a flexible disk, a hard disk, a CD-ROM, an MO, a DVD, a DVD-ROM, a DVD-RAM, and a semiconductor memory. Also, the present invention may be realized by the computer program or the digital signal recorded on such recording media.

Further, the present invention may be realized by the computer program or the digital signal transmitted via an electric communication line, a wired/wireless line, or a network such as the Internet.

Moreover, the present invention may be realized by a computer system including a microprocessor and a memory. The memory may store the computer program, and the microprocessor may operate in accordance with the computer program. Examples of the computer system include home appliances such as a TV, a refrigerator, a telephone, and an air conditioner.

The computer program or the digital signal may be transferred as being recorded on the recording medium, or via the network and the like, so that the computer program or the digital signal may be executed by another independent computer system.

(7) The above embodiment and the modifications can be freely combined.

(Effects of the Invention)

As described above, the present invention provides a program execution apparatus that determines an execution sequence of tasks and executes the tasks according to the execution sequence, each task being given a target completion time before which execution of the task is to be completed, the program execution apparatus including: a storing unit operable to store at least one identifier of at least one task that is already in existence, at a memory position therein determined based upon a plurality of types of priorities set for the task, the plurality of types of priorities having a hierarchical relationship; a receiving unit operable to receive an identifier of a new task and a plurality of types of priorities set for the new task; a writing unit operable to write the identifier received by the receiving unit, at a memory position in the storing unit determined based upon the plurality of types of priorities received by the receiving unit; and a determining unit operable to determine an execution sequence of the tasks whose identifiers are stored in the storing unit, according to an arrangement sequence of the identifiers in the storing unit.

According to this construction, the program execution apparatus is enabled to appropriately control an execution sequence of tasks, based upon a plurality of types of priorities having a hierarchical relationship among them set for each task.

Here, in the program execution apparatus, a first-type priority and a second-type priority may be set for each task as the plurality of types of priorities, the first-type priority being a target completion time before which execution of the task is to be completed, the second-type priority being lower in a hierarchy than the first-type priority, the storing unit may store a plurality of groups each including identifiers of tasks for which a same target completion time is set as a first-type priority, the plurality of groups being arranged at memory positions in the storing unit in an arrangement sequence determined in an order of a target completion time set for each group, the identifiers of the tasks in each group being arranged at memory positions in each group in the storing unit in an arrangement sequence determined based upon a second-type priority set for each task in the group, the receiving unit may receive the identifier of the new task, and a target completion time as a first-type priority and a second-type priority that are set for the new task, the writing unit may write the received identifier, at the memory position in the storing unit determined based upon the received second-type priority in a group including identifiers of tasks for which a first-type priority that is the same as the received first-type priority is set, and the determining unit may determine the execution sequence of the tasks whose identifiers are stored in the storing unit, according to the arrangement sequence of the identifiers in the storing unit determined based upon a first-type priority and a second-type priority set for each task.

According to this construction, the program execution apparatus is enabled to appropriately control an execution sequence of a plurality of tasks for which the same target completion time before which execution the tasks needs to be completed is set, based upon the second-type priority set for each task.

Here, in the program execution apparatus, the storing unit may store, for a beginning group that includes identifiers of tasks for which a target completion time closest to a present time is set as a first-type priority and that is arranged at a beginning of the arrangement sequence of the plurality of groups, the closest target completion time as the first-type priority, and store, for each of groups that follow the beginning group in the arrangement sequence, a time period between (a) a target completion time set for tasks whose identifiers are included in the group and (b) a target completion time set for tasks whose identifiers are included in a group that precedes the group in the arrangement sequence, and the writing unit may compare the target completion time received by the receiving unit with the closest target completion time, and (i) when finding a match, write the received identifier, at the memory position in the storing unit determined based upon the received second-type priority in the beginning group, and (ii) when not finding a match, further compare, for each of the groups that follow the beginning group, (c) the target completion time received by the receiving unit with (d) a time at which the time period stored for the group elapses from a target completion time set for a group that precedes the group in the arrangement sequence, and when finding a match, write the received identifier at the memory position in the storing unit determined based upon the received second-type priority in the group.

According to this construction, the storing unit stores the above-described time period for each of the following groups. This enables the writing unit to delete such an amount of data to be deleted for enabling the writing process.

Here, in the program execution apparatus, a lowest value of a first-type priority may be a maximum value that can be expressed by a predetermined bit sequence constituting a target completion time, the storing unit may store a last group including identifiers of tasks for which a target completion time constituted by a predetermined bit sequence expressing the maximum value is set, at a memory position that is a last of the arrangement sequence of the plurality of groups, determined based upon the target completion time, the receiving unit may receive the identifier of the new task, and the target completion time constituted by the bit predetermined sequence expressing the maximum value and the second-type priority that are set for the new task, and the writing unit may write the received identifier, at the memory position in the storing unit determined based upon the received second-type priority in the last group.

According to this construction, the program execution apparatus is enabled to control a value of the first-type priority to be set for a task so as to be the lowest value.

Here, in the program execution apparatus, the storing unit may further store, for each group, a total execution time period that is predicted to take to execute all tasks whose identifiers are included in the group, the receiving unit may further receive an execution time period that is predicted to take to execute the new task, and the program execution apparatus may further include a judging unit operable to judge whether a time at which a time period obtained by adding the total execution time period and the execution time period received by the receiving unit elapses from a present time is before the target completion time set for the new task, and when judging negatively, output a reject signal indicating to reject execution of the new task, wherein when the judging unit judges affirmatively, the writing unit may write the received identifier, at the memory position in the storing unit determined based upon the received second-type priority in a group including identifiers of tasks for which a first-type priority that is the same as the received first-type priority is set.

According to this construction, the program execution apparatus provides such control that enables execution of a task to be completed before the target completion time before which execution of the task needs to be completed.

Here, in the program execution apparatus, the judging unit may select one of groups that follow a group in the arrangement sequence of the plurality of groups, and judge whether a time at which a total execution time period for the selected group elapses from a present time is before a target completion time set for tasks whose identifiers are included in the selected group, the judging unit repeating the selection and judgment processes on each of the following groups, and when the judging unit judges affirmatively for all of the following groups, the writing unit may write the received identifier, at the memory position in the storing unit determined based upon the received second-type priority in a group including identifiers of tasks for which a first-type priority that is the same as the received first-type priority is set, and when the judging unit judges negatively for any of the following groups, the writing unit may output a reject signal indicating to reject execution of the new task.

According to this construction, the program execution apparatus further provides such control that enables execution of all tasks stored in the storing unit to be completed before the target completion time before which execution of each task needs to be completed.

Here, in the program execution apparatus, a first-type priority and a second-type priority may be set for each task, the first-type priority being a value obtained by multiplying predetermined time-units of a target completion time set for the task by an integer, the second-type priority being a value of a remaining time-unit of the target completion time that is a smaller unit than the predetermined time-units, the storing unit may store a plurality of groups each including identifiers of tasks for which a same first-type priority is set, the plurality of groups being arranged at memory positions in the storing unit in an arrangement sequence determined based upon a first-type priority set for each group, the identifiers of the tasks in each group being arranged at memory positions in the storing unit in an arrangement sequence determined based upon a second-type priority set for each task in the group, the receiving unit may receive the identifier of the new task, and a first-type priority and a second-type priority that are set for the new task, the writing unit may write the received identifier, at a memory position in the storing unit determined based upon the received second-type priority in a group including identifiers of tasks for which a first-type priority that is the same as the received first-type priority is set, and the determining unit may determine the execution sequence of the tasks whose identifiers are stored in the storing unit, according to the arrangement sequence of the identifiers in the storing unit determined based upon a first-type priority and a second-type priority set for each task.

According to this construction, the program execution apparatus is enabled to appropriately control an execution sequence of tasks in the case where only one type of priority, i.e., the target completion time before which the task needs to be completed, is set for each task.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A program execution apparatus that determines an execution sequence of tasks and executes the tasks according to the execution sequence, each task being given a target completion time before which execution of the task is to be completed, the program execution apparatus comprising:
    a storing unit operable to store at least one identifier of at least one task that is already in existence, at a memory position therein determined based upon a plurality of types of priorities set for the task, the plurality of types of priorities having a hierarchical relationship;
    a receiving unit operable to receive an identifier of a new task and a plurality of types of priorities set for the new task;
    a writing unit operable to write the identifier received by the receiving unit, at a memory position in the storing unit determined based upon the plurality of types of priorities received by the receiving unit; and
    a determining unit operable to determine an execution sequence of the tasks whose identifiers are stored in the storing unit, according to an arrangement sequence of the identifiers in the storing unit, wherein
    at least a first-type priority and a second-type priority are set for each task as the plurality of types of priorities, the second-type priority being lower in a hierarchy than the first-type priority,
    the storing unit stores a plurality of groups each including identifiers of tasks for which a same value is set as a first-type priority, the plurality of groups being arranged at memory positions in the storing unit in an arrangement sequence determined in an order of the value of a first-type priority set for each group, the identifiers of the tasks in each group being arranged at memory positions in each group in the storing unit in an arrangement sequence determined based upon a second-type priority set for each task in the group,
    the receiving unit receives the identifier of the new task, and a value of a first-type priority and a value of a second-type priority that are set for the new task,
    the writing unit writes the received identifier, at the memory position in the storing unit determined based upon the received value of the second-type priority in a group including identifiers of tasks for which a first-type priority that is the same as the received value of the first-type priority is set,
    the determining unit determines the execution sequence of the tasks whose identifiers are stored in the storing unit, according to the arrangement sequence of the identifiers in the storing unit determined based upon a first-type priority and a second-type priority set for each task,
    the first-type priority is a target completion time before which execution of the task for which the first-type priority is set is to be completed, the storing unit stores a plurality of groups each including identifiers of tasks for which a same target completion time is set as a first-type priority, the plurality of groups being arranged at memory positions in the storing unit in an arrangement sequence determined in an order of a target completion time set for each group, the receiving unit receives a target completion time as the first-type priority, and the writing unit writes the received identifier, at the memory position in the storing unit determined based upon the received second-type priority in a group including identifiers of tasks for which a first-type priority that has the same target completion time as the received first-type priority is set.

2. The program execution apparatus of claim 1, wherein the storing unit stores, for a beginning group that includes identifiers of tasks for which a target completion time closest to a present time is set as a first-type priority and that is arranged at a beginning of the arrangement sequence of the plurality of groups, the closest target completion time as the first-type priority, and stores, for each of groups that follow the beginning group in the arrangement sequence, a time period between (a) a target completion time set for tasks whose identifiers are included in the group and (b) a target completion time set for tasks whose identifiers are included in a group that precedes the group in the arrangement sequence, and the writing unit compares the target completion time received by the receiving unit with the closest target completion time, and (i) when finding a match, writes the received identifier, at the memory position in the storing unit determined based upon the received second-type priority in the beginning group, and (ii) when not finding a match, further compares, for each of the groups that follow the beginning group, (c) the target completion time received by the receiving unit with (d) a time at which the time period stored for the group elapses from a target completion time set for a group that precedes the group in the arrangement sequence, and when finding a match, writes the received identifier at the memory position in the storing unit determined based upon the received second-type priority in the group.

3. The program execution apparatus of claim 1, wherein a lowest value of a first-type priority is a maximum value that can be expressed by a predetermined bit sequence constituting a target completion time, the storing unit stores a last group including identifiers of tasks for which a target completion time constituted by a predetermined bit sequence expressing the maximum value is set, at a memory position that is a last of the arrangement sequence of the plurality of groups, determined based upon the target completion time, the receiving unit receives the identifier of the new task, and the target completion time constituted by the bit predetermined sequence expressing the maximum value and the second-type priority that are set for the new task, and the writing unit writes the received identifier, at the memory position in the storing unit determined based upon the received second-type priority in the last group.

4. The program execution apparatus of claim 1, wherein the storing unit further stores, for each group, a total execution time period that is predicted to take to execute all tasks whose identifiers are included in the group, the receiving unit further receives an execution time period that is predicted to take to execute the new task, and the program execution apparatus further includes a judging unit operable to judge whether a time at which a time period obtained by adding the total execution time period and the execution time period received by the receiving unit elapses from a present time is before the target completion time set for the new task, and when judging negatively, output a reject signal indicating to reject execution of the new task, wherein when the judging unit judges affirmatively, the writing unit writes the received identifier, at the memory position in the storing unit determined based upon the received second-type priority in a group including identifiers of tasks for which a first-type priority that is the same as the received first-type priority is set.

5. The program execution apparatus of claim 4, wherein the judging unit selects one of groups that follow a group in the arrangement sequence of the plurality of groups, and judges whether a time at which a total execution time period for the selected group elapses from a present time is before a target completion time set for tasks whose identifiers are included in the selected group, the judging unit repeating the selection and judgment processes on each of the following groups, and when the judging unit judges affirmatively for all of the following groups, the writing unit writes the received identifier, at the memory position in the storing unit determined based upon the received second-type priority in a group including identifiers of tasks for which a first-type priority that is the same as the received first-type priority is set, and when the judging unit judges negatively for any of the following groups, the writing unit outputs a reject signal indicating to reject execution of the new task.

6. A program execution apparatus that determines an execution sequence of tasks and executes the tasks according to the execution sequence, each task being given a target completion time before which execution of the task is to be completed. the program execution apparatus comprising:

a storing unit operable to store at least one identifier of at least one task that is already in existence, at a memory position therein determined based upon a plurality of types of priorities set for the task, the plurality of types of priorities having a hierarchical relationship;

a receiving unit operable to receive an identifier of a new task and a plurality of types of priorities set for the new task;

a writing unit operable to write the identifier received by the receiving unit, at a memory position in the storing unit determined based upon the plurality of types of priorities received by the receiving unit; and a determining unit operable to determine an execution sequence of the tasks whose identifiers are stored in the storing unit, according to an arrangement sequence of the identifiers in the storing unit, wherein at least a first-type priority and a second-type priority are set for each task as the plurality of types of priorities, the second-type priority being lower in a hierarchy than the first-type priority, the storing unit stores a plurality of groups each including identifiers of tasks for which a same value is set as a first-type priority, the plurality of groups being arranged at memory positions in the storing unit in an arrangement sequence determined in an order of a first-type priority set for each group, the identifiers of the tasks in each group being arranged at memory positions in each group in the storing unit in an arrangement sequence determined based upon a second-type priority set for each task in the group, the receiving unit receives the identifier of the new task, and a value of a first-type priority and a value of a second-type priority that are set for the new task, the writing unit writes the received identifier, at the memory position in the storing unit determined based upon the received value of the second-type priority in a group including identifiers of tasks for which a first-type priority that is the same as the received value of the first-type priority is set, the determining unit determines the execution sequence of the tasks whose identifiers are stored in the storing unit, according to the arrangement sequence of the identifiers in the storing unit determined based upon a first-type priority and a second-type priority set for each task, a first-type priority and a second-type priority are set for each task, the first-type priority being a value obtained by multiplying predetermined time-units of a target completion time set for the task by an integer, the second-type priority being a value of a remaining time-unit of the target completion time that is a smaller unit than the predetermined time-units, the storing unit stores a plurality of groups each including identifiers of tasks for which a same first-type priority is set, the plurality of groups being arranged at memory positions in the storing unit in an arrangement sequence determined based upon a first-type priority set for each group, the identifiers of the tasks in each group being arranged at memory positions in the storing unit in an arrangement sequence determined based upon a second-type priority set for each task in the group, the receiving unit receives the identifier of the new task, and a first-type priority and a second-type priority that are set for the new task, the writing unit writes the received identifier, at a memory position in the storing unit determined based upon the received second-type priority in a group including identifiers of tasks for which a first-type priority that is the same as the received first-type priority is set, and the determining unit determines the execution sequence of the tasks whose identifiers are stored in the storing unit, according to the arrangement sequence of the identifiers in the storing unit determined based upon a first-type priority and a second-type priority set for each task.

* * * * *